(12) United States Patent
Ohmori et al.

(10) Patent No.: US 9,083,011 B2
(45) Date of Patent: Jul. 14, 2015

(54) SOLID OXIDE FUEL CELL

(75) Inventors: Makoto Ohmori, Nagoya (JP); Takashi Ryu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 22 days.

(21) Appl. No.: 13/315,617

(22) Filed: Dec. 9, 2011

(65) Prior Publication Data

US 2012/0148934 A1  Jun. 14, 2012

(30) Foreign Application Priority Data

Dec. 13, 2010  (JP) ................................ 2010-277223
Sep. 16, 2011  (JP) ................................ 2011-202757

(51) Int. Cl.
H01M 8/10 (2006.01)
H01M 8/02 (2006.01)
H01M 8/12 (2006.01)
H01M 8/24 (2006.01)

(52) U.S. Cl.
CPC .......... H01M 8/0236 (2013.01); H01M 8/0245 (2013.01); H01M 8/1206 (2013.01); H01M 8/2425 (2013.01); Y02E 60/521 (2013.01); Y02E 60/525 (2013.01)

(58) Field of Classification Search
USPC .................... 429/517–522, 463, 482
See application file for complete search history.

(56) References Cited

U.S. PATENT DOCUMENTS 5,185,219 A * 2/1993 Ishihara et al. ............... 429/480
5,639,572 A * 6/1997 Mori et al. .................... 429/123

2004/0121197 A1 * 6/2004 Suganuma et al. ............. 429/12
2005/0048356 A1   3/2005 Ihringer et al.
2006/0153974 A1 * 7/2006 Matsuzaki et al. ........... 427/115
(Continued)

FOREIGN PATENT DOCUMENTS

EP  1 328 035 A1  7/2003
EP  1 464 092 A2  10/2004
(Continued)

OTHER PUBLICATIONS

Rajendra N. Basu, et al., "Microstructure and Electrical Conductivity of LaNi0.0Fe0.4O3 Prepared by Combustion Synthesis Routes," Materials Research Bulletin, vol. 29, 2004, pp. 1335-1345.*
(Continued)

*Primary Examiner* — Jonathan Jelsma
*Assistant Examiner* — Rashid Alam
(74) *Attorney, Agent, or Firm* — Burr & Brown, PLLC

(57) ABSTRACT

Provided is an SOFC, including a fuel electrode (20), a thin-plate-like interconnector (30) provided on the fuel electrode and formed of a conductive ceramics material, and a conductive film (70) formed on a surface of the interconnector (30) opposite to the fuel electrode (20). The conductive film (70) is formed of an N-type semiconductor (e.g., $LaNiO_3$). The N-type semiconductor generally has the property of exhibiting a smaller conductivity (a current hardly flows) at higher temperature. Therefore, a portion with a higher current density (thus, a portion with higher temperature) in the conductive film (70) in the vicinity of the interconnector (30) has a smaller conductivity (a current hardly flows). By virtue of this action, even though a "fluctuation in current density of a current flowing through the interconnector (30) and an area in the vicinity thereof" occurs for some reasons, the fluctuation can be suppressed.

10 Claims, 22 Drawing Sheets

(56) References Cited

U.S. PATENT DOCUMENTS

| | | | |
|---|---|---|---|
| 2008/0090127 A1* | 4/2008 | Gorte et al. | 429/30 |
| 2009/0087691 A1* | 4/2009 | Uchiyama | 429/7 |
| 2010/0098999 A1* | 4/2010 | Niimi et al. | 429/33 |
| 2010/0178587 A1 | 7/2010 | Inoue et al. | |
| 2011/0236789 A1* | 9/2011 | Namba et al. | 429/489 |
| 2011/0269047 A1* | 11/2011 | Tucker et al. | 429/452 |

FOREIGN PATENT DOCUMENTS

| | | |
|---|---|---|
| EP | 1 976 045 A1 | 1/2008 |
| EP | 1 990 853 A1 | 11/2008 |
| EP | 2 306 568 A1 | 4/2011 |
| JP | 2002-280002 | 9/2002 |
| JP | 2005-514748 | 5/2005 |
| JP | 2007-200703 | 8/2007 |
| JP | 2007-227306 | 9/2007 |
| JP | 4146738 | 6/2008 |
| JP | 2008-204936 | 9/2008 |
| JP | 2009-277411 | 11/2009 |
| JP | 2010-70793 | 4/2010 |
| WO | 03/058744 A2 | 7/2003 |
| WO | 2007/083627 A1 | 7/2007 |
| WO | 2007/105403 A1 | 9/2007 |
| WO | 2010/007722 A1 | 1/2010 |
| WO | WO 2010030300 A1 * | 3/2010 |
| WO | WO 2010087298 A1 * | 8/2010 |

OTHER PUBLICATIONS

English translation of WO 2010087298 A1, Higashi et al., Aug. 2010, World Intellectual Property Organization (WIPO).*

Mohamed Bahgat et al., "*Electrical, Magnetic, and Corrosion Resistance Properties of $TiO_2$ Nanotubes Filled with $NiFe_2O_4$ Quantum Dots and Ni—Fe Nanoalloy,*" Applied Nanoscience, vol. 3, No. 3, Apr. 24, 2012, pp. 241-249.

Extended European Search Report (Application No. 11849840.1) dated Dec. 10, 2014.

* cited by examiner

COMPARATIVE EMBODIMENT

PRESENT INVENTION

COMPARATIVE EMBODIMENT

PRESENT INVENTION

FIG.22
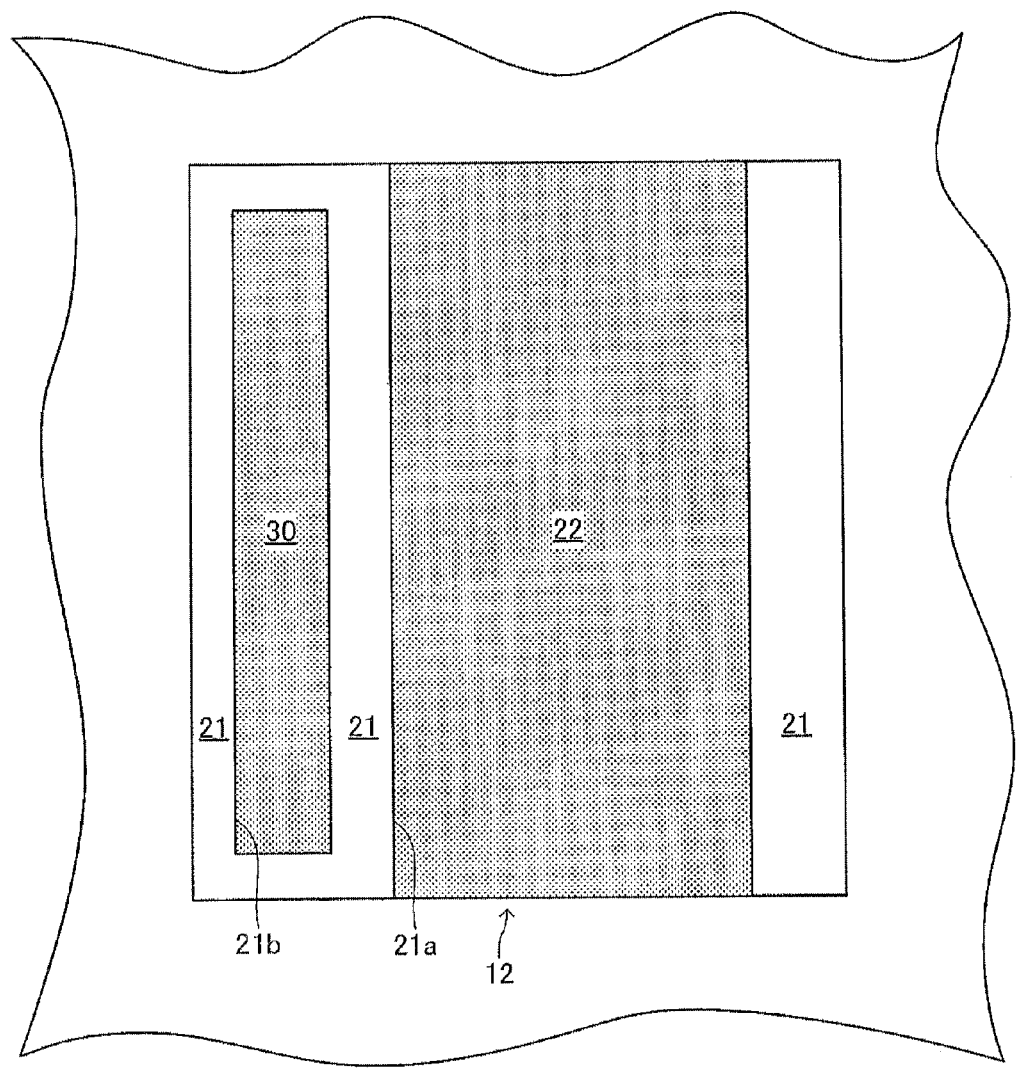
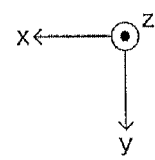

SOLID OXIDE FUEL CELL

BACKGROUND OF THE INVENTION

1. Field of the Invention

The present invention relates to a solid oxide fuel cell.

2. Description of the Related Art (A power generation part of) a solid oxide fuel cell (SOFC) is formed by sequentially laminating a fuel electrode, an electrolyte film formed of a solid electrolyte, and an air electrode. In (the power generation part of) the SOFC, a difference in electric potential between the fuel electrode and the air electrode is generated based on a difference in oxygen potential between both surfaces of the electrolyte film by supplying a fuel gas (e.g., hydrogen gas) to the fuel electrode and supplying a gas containing oxygen (e.g., air) to the air electrode.

In the SOFC, an interconnector(s) (conductive connecting member(s) for current collection) is/are generally provided so as to be electrically connected to any one or both of the fuel electrode and the air electrode. Power based on the difference in electric potential is output via the interconnector(s).

With regard to the SOFC provided with an interconnector as described above, Japanese Patent No. 4146738 describes an SOFC in which an interconnector formed of dense conductive ceramics is provided on a fuel electrode and a conductive film formed of a P-type semiconductor is provided on the surface of the interconnector. The literature describes that, when the conductive film formed of a P-type semiconductor is provided on the surface of the interconnector, a current can be allowed to flow efficiently (i.e., an improvement in conductivity is achieved), although the reason for this is unclear.

SUMMARY OF THE INVENTION

In general, a current is likely to flow through a path with lower electric resistance. In the SOFC described in the above-mentioned literature, therefore, when a current flows through the conductive film, the interconnector, and the fuel electrode in the stated order, a fluctuation in amplitude of the current (amplitude of the current per unit area or current density) flowing through the interconnector and an area in the vicinity thereof may occur depending on, for example, modes of the flow of the current (direction and range of the current) flowing through the conductive film toward the interconnector (see FIGS. 13 and 17 to be described later). In general, the degree of heat generation due to Joule heat or the like becomes larger at a portion with a higher current density. Therefore, the portion with a higher current density in the interconnector and the area in the vicinity thereof has a higher temperature.

Meanwhile, in the SOFC described in the above-mentioned literature, the P-type semiconductor is used as the material for the conductive film as described above. In general, the P-type semiconductor has the property of exhibiting a larger conductivity at higher temperature. Therefore, the portion with a higher current density in the conductive film in the vicinity of the interconnector has a higher conductivity. This means that the fluctuation in current density of the current flowing through the interconnector and the area in the vicinity thereof is enhanced.

As described above, in the SOFC described in the above-mentioned literature, when a fluctuation in current density of the current flowing through the interconnector and the area in the vicinity thereof occurs, the fluctuation is enhanced. As a result, a fluctuation in temperature in the interconnector and the area in the vicinity thereof increases, which may cause the problem of occurrence of a locally large thermal stress.

The present invention has been made to address the problems, and it is an object of the present invention is to provide a solid oxide fuel cell capable of suppressing a fluctuation in current density of a current flowing through an interconnector and an area in the vicinity thereof.

An SOFC according to the present invention includes: a power generation part of a solid oxide fuel cell, including: a fuel electrode for allowing a fuel gas to be reacted by bringing the fuel gas into contact therewith; an electrolyte film formed of a solid electrolyte provided on the fuel electrode; and an air electrode for allowing a gas containing oxygen to be reacted, the air electrode being provided on the electrolyte film so that the electrolyte film is sandwiched between the fuel electrode and the air electrode; and an interconnector provided so as to be electrically connected to one of the fuel electrode and the air electrode.

The SOFC according to the present invention includes a conductive film formed on a surface of the interconnector, the conductive film being formed of a conductive ceramics material having the property of exhibiting a smaller conductivity at higher temperature within the range of 650 to 850° C. An N-type semiconductor may be adopted as the conductive film.

The operation temperature of the SOFC is 650 to 800° C. According to the configuration described above, therefore, a portion with a higher current density (higher temperature) in the conductive film in the vicinity of the interconnector has a smaller conductivity during the operation of the SOFC in contrast to the SOFC described in the above-mentioned patent literature. This means that a fluctuation in current density of a current flowing through the interconnector and an area in the vicinity thereof is suppressed. As a result, a fluctuation in temperature in the interconnector and the area in the vicinity thereof becomes smaller so that a large thermal stress is unlikely to be locally generated.

In the SOFC according to the present invention, the conductive film suitably includes a material (N-type semiconductor) represented by a chemical formula of $LaNi_{1-x-y}Cu_xFe_yO_3$ where relationships of x>0, y>0, and x+y<1 are satisfied. The material has as high a conductivity as, e.g., 800 S/cm or more at 750° C. and has as low a thermal expansion coefficient as, e.g., 13.5 ppm/K or less. It can therefore be said that the material is a material suitable for the conductive film in terms of both of the conductivity and the thermal expansion coefficient. The details of the material are described in Japanese Patent Application No. 2010-070793.

When the interconnector is provided on the fuel electrode, the interconnector suitably includes a chromite-based material (dense conductive ceramics) represented by a chemical formula of $Ln_{1-x}A_xCr_{1-y-z}B_yO_3$ where Ln represents at least one kind of element selected from the group consisting of Y and lanthanoid elements, A represents at least one kind of element selected from the group consisting of Ca, Sr, and Ba, B represents at least one kind of element selected from the group consisting of Ti, V, Mn, Fe, Co, Cu, Ni, Zn, Mg, and Al, and relationships of $0.025 \leq x \leq 0.3$, $0 \leq y \leq 0.22$, and $0 \leq z \leq 0.15$ are satisfied. For example, there may be adopted "lanthanum chromite ($LaCrO_3$)" using lanthanum (La) as "Ln".

This is based on the fact that one end (inner side) of the interconnector (terminal electrode) of the fuel electrode is exposed to a reducing atmosphere and the other end (outer side) is exposed to an oxidizing atmosphere. At present, as a conductive ceramics material stable both in the reducing atmosphere and the oxidizing atmosphere, $LaCrO_3$ is excellent.

Alternatively, when the interconnector is provided on the fuel electrode, the interconnector suitably includes a titanium oxide (dense conductive ceramics) represented by a chemical formula of $(A_{1-x}, B_x)_{1-z}(Ti_{1-y}, D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships of $0 \le x \le 0.5$, $0 \le y \le 0.5$, and $-0.05 \le z \le 0.05$ are satisfied. For example, there may be adopted "strontium titanate $(SrTiO_3)$" using strontium (Sr) as "A". $SrTiO_3$ is also stable both in the reducing atmosphere and the oxidizing atmosphere.

BRIEF DESCRIPTION OF THE DRAWINGS

FIG. 22 is a plane view illustrating states of a fuel electrode and an interconnector embedded in the corresponding recesses of a support substrate illustrated in FIG. 21.

DETAILED DESCRIPTION OF THE INVENTION

Configuration

Figure 1:
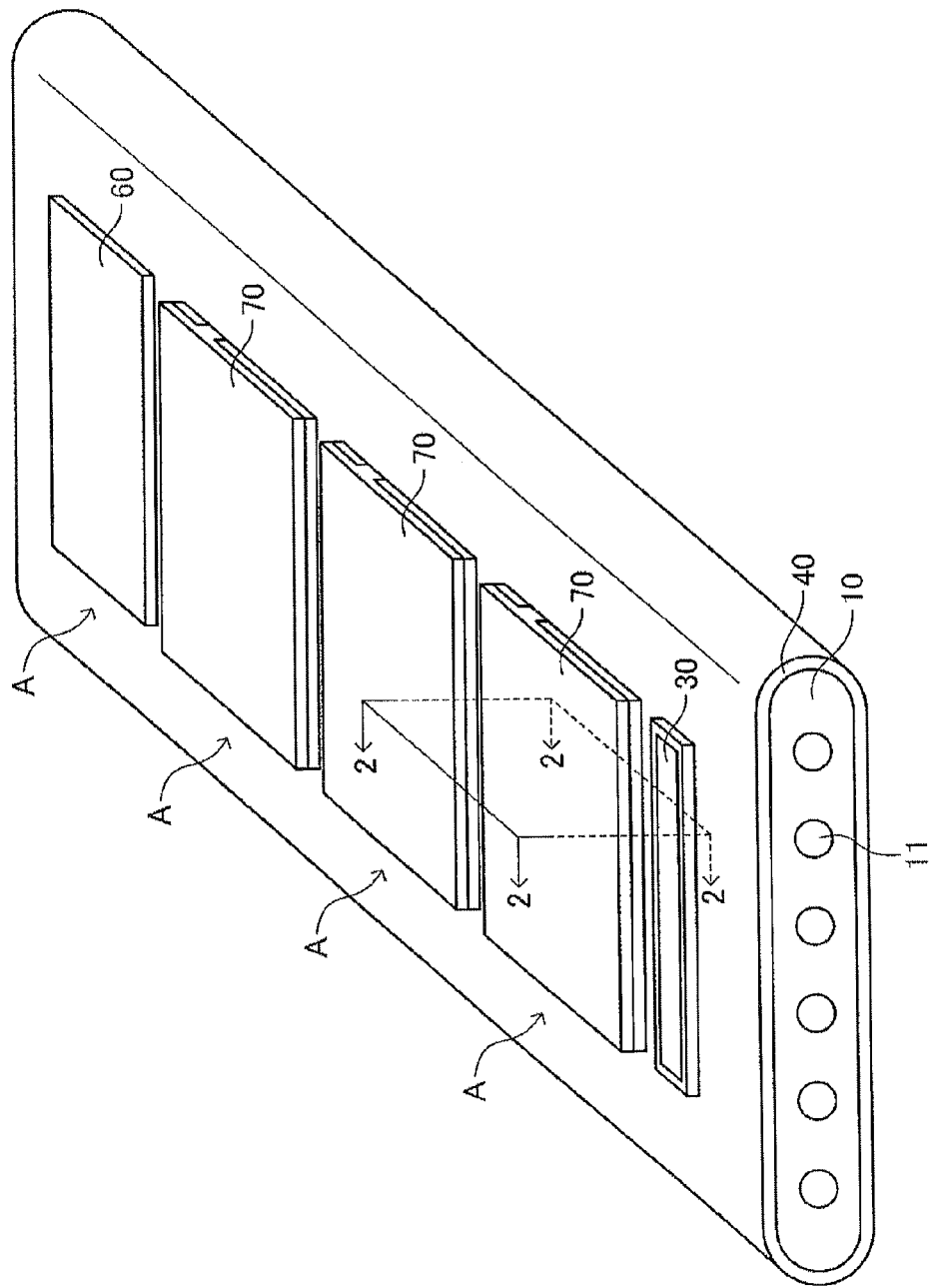
FIG. 1 is a perspective view illustrating a fuel cell according to an embodiment of the present invention.

FIG. 1 illustrates a solid oxide fuel cell (SOFC) according to an embodiment of the present invention. The SOFC has a configuration called a "segmented-in-series type (horizontal stripe type)" in which, on each of the upper and lower surfaces (opposite main surfaces (planes) parallel to each other) of a flat-plate-like support substrate 10 having a longitudinal direction, a plurality of (in this embodiment, four) power-generating elements A having the same shape and connected electrically in series are disposed at predetermined intervals along the longitudinal direction.

Figure 2:
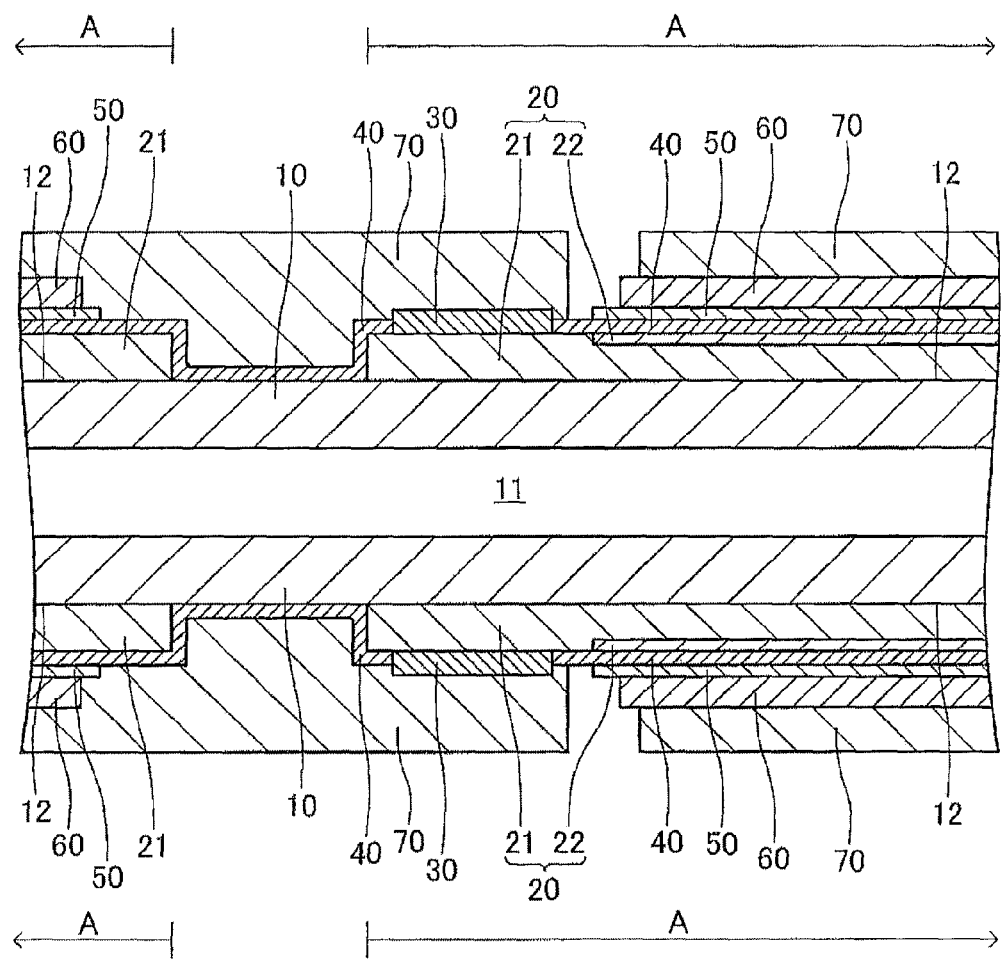
FIG. 2 is a sectional view corresponding to the line 2-2 of the fuel cell illustrated in FIG. 1.

As viewed from above, the entire SOFC has a rectangular shape with 5 to 50 cm on sides along the longitudinal direction and 1 to 10 cm on sides along a width direction orthogonal to the longitudinal direction. The total thickness of the SOFC is 1 to 5 mm. It is preferred that the entire SOFC have a vertically symmetrical shape with respect to a plane which passes the center with respect to the thickness direction and is parallel to the main surfaces of the support substrate 10, but the shape is not limited thereto. The SOFC is described in detail below with reference to, in addition to FIG. 1, FIG. 2, which is a fragmentary sectional view of the SOFC corresponding to the line 2-2 illustrated in FIG. 1. FIG. 2 is a fragmentary sectional view illustrating the configurations (parts of the configurations) of a typical pair of adjacent power-generating elements A, A and a configuration between the power-generating elements A, A. The configurations between adjacent power-generating elements A, A of other pairs are similar to that illustrated in FIG. 2.

The support substrate 10 is a flat-plate-like sintered body formed of a porous material having no electron conductivity. The end portions of outer surfaces of the support substrate 10 have curved surfaces convex outwardly (along the width direction). The support substrate 10 has a plurality of (in this embodiment, six) fuel gas flow channels 11 (through holes) formed therein, extending in the longitudinal direction, and disposed at predetermined intervals along the width direction.

The support substrate 10 may be formed of, for example, calcia-stabilized zirconia (CSZ). Alternatively, the support substrate 10 may be formed of nickel oxide (NiO) and yttria-stabilized zirconia (YSZ) (8YSZ), may be formed of nickel oxide (NiO) and yttria $(Y_2O_3)$, or may be formed of magnesium oxide (MgO) and magnesia alumina spinel $(MgAl_2O_4)$. The thickness of the support substrate 10 is 1 to 5 mm. For the purpose of simple description, only the configuration on the upper side of the support substrate 10 is described below. The configuration on the lower side of the support substrate 10 is the same as that on the upper side.

As illustrated in FIG. 2, a rectangular parallelepiped fuel electrode 20 is provided on the upper surface (upper main surface) of the support substrate 10. The fuel electrode 20 is a sintered body formed of a porous material having electron conductivity. The fuel electrode 20 includes a fuel-electrode active portion 22, which is brought into contact with a solid electrolyte film 40 to be described later, and a fuel-electrode current-collecting portion 21, which corresponds to the residual portion of the fuel electrode except for the fuel-electrode active portion 22. As viewed from above, the fuel-electrode active portion 22 has a rectangular shape extending along the width direction over the area where the fuel-electrode current-collecting portion 21 is provided.

The fuel-electrode active portion 22 may be formed of, for example, nickel oxide (NiO) and yttria-stabilized zirconia (YSZ) (8YSZ). Alternatively, the fuel-electrode active portion 22 may be formed of nickel oxide (NiO) and gadolinium-doped ceria (GDC). The fuel-electrode current-collecting portion 21 may be formed of, for example, nickel oxide (NiO) and yttria-stablized zirconia (YSZ) (8YSZ). Alternatively, the fuel-electrode current-collecting portion 21 may be formed of nickel oxide (NiO) and yttria ($Y_2O_3$), or may be formed of nickel oxide (NiO) and calcia-stabilized zirconia (CSZ). The thickness of the fuel-electrode active portion 22 is 5 to 30 μm and the thickness of the fuel-electrode current-collecting portion 21 is 50 to 500 μm.

As described above, the fuel-electrode current-collecting portion 21 includes a substance having electron conductivity. The fuel-electrode active portion 22 includes a substance having electron conductivity and a substance having oxygen ion conductivity. The "volume ratio of a substance having oxygen ion conductivity relative to the total volume excluding pores" in the fuel-electrode active portion 22 is larger than the "volume ratio of a substance having oxygen ion conductivity relative to the total volume excluding pores" in the fuel-electrode current-collecting portion 21.

A thin-plate-like interconnector 30 is formed on a predetermined portion of the upper surface of each fuel electrode 20 (more specifically, each fuel-electrode current-collecting portion 21). The interconnector 30 is a sintered body formed of a dense conductive ceramics material having electron conductivity. As viewed from above, the interconnector 30 has a rectangular shape extending along the width direction over the area where the fuel electrode 20 is provided. The thickness of the interconnector 30 is 10 to 100 μm.

The interconnector 30 may be formed of, for example, a chromite-based material. The chromite-based material is represented by a chemical formula of $Ln_{1-x}A_xCr_{1-y-z}B_yO_3$ where Ln represents at least one kind of element selected from the group consisting of Y and lanthanoid elements, A represents at least one kind of element selected from the group consisting of Ca, Sr, and Ba, B represents at least one kind of element selected from the group consisting of Ti, V, Mn, Fe, Co, Cu, Ni, Zn, Mg, and Al, and relationships of $0.025 \leq x \leq 0.3$, $0 \leq y \leq 0.22$, and $0 \leq z \leq 0.15$ are satisfied. In this case, the interconnector 30 may be formed of lanthanum chromite ($LaCrO_3$).

Alternatively, the interconnector 30 may be formed of a titanium oxide. The titanium oxide is represented by a chemical formula of $(A_{1-x}, B_x)_{1-z}(Ti_{1-y}, D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships of $0 \leq x \leq 0.5$, $0 \leq y \leq 0.5$, and $-0.05 \leq z \leq 0.05$ are satisfied. In this case, the interconnector 30 may be formed of strontium titanate (Sr, La)$TiO_3$).

The solid electrolyte film 40 covers the entire longitudinally extending outer surface of the support substrate 10 on which a plurality of the fuel electrodes 20 are provided, except for surface regions on which a plurality of the interconnectors 30 are formed. The solid electrolyte film 40 is a sintered body formed of a dense material having ion conductivity and having no electron conductivity. The solid electrolyte film 40 may be formed of, for example, yttria-stabilized zirconia (YSZ) containing yttria ($Y_2O_3$). Alternatively, the solid electrolyte film 40 may be formed of lanthanum gallate (LSGM). The thickness of the solid electrolyte film 40 is 3 to 50 μm.

Namely, a dense layer formed of the interconnectors 30 and the solid electrolyte film 40 covers the entire longitudinally extending outer surface of the support substrate 10 on which a plurality of the fuel electrodes 20 are provided. The dense layer exhibits a gas seal function of preventing the mixing of a fuel gas flowing through a space on the inside of the dense layer and air flowing through a space on the outside of the dense layer. In this case, "the interconnectors 30 and the solid electrolyte film 40" formed of dense materials collectively correspond to a "gas seal portion."

Air electrodes 60 are formed, via respective reaction prevention films 50, on the respective upper surfaces of those portions of the solid electrolyte film 40 which are in contact with the fuel-electrode active portions 22. The reaction prevention film 50 is a sintered body formed of a dense material, and the air electrode 60 is a sintered body formed of a porous material having electron conductivity. As viewed from above, the reaction prevention film 50 and the air electrode 60 each have a rectangular shape substantially similar to that of the fuel-electrode active portion 22.

The reaction prevention film 50 may be formed of, for example, gadolinium-doped ceria (GDC=(Ce, Gd)$O_2$). The thickness of the reaction prevention film 50 is 3 to 50 μm. The air electrode 60 may be formed of, for example, lanthanum strontium cobalt ferrite (LSCF=(La, Sr)(Co, Fe)$O_3$). Alternatively, the air electrode 60 may be formed of lanthanum strontium ferrite (LSF=(La, Sr)$FeO_3$), lanthanum nickel ferrite (LNF=La(Ni, Fe)$O_3$), lanthanum strontium cobaltite (LSC=(La, Sr)$CoO_3$), or the like. Alternatively, the air electrode 60 may be formed of two layers including a first layer (inner layer) formed of LSCF and a second layer (outer layer) of LSC. The thickness of the air electrode 60 is 10 to 100 μm.

It should be noted that the reason for using the reaction prevention film 50 as an intervening film is to suppress the occurrence of the phenomenon that, during SOFC production or in an operating SOFC, YSZ in the solid electrolyte film 40 and Sr in the air electrode 60 react with each other to form a reaction film having high electric resistance at the interface between the solid electrolyte film 40 and the air electrode 60.

In this case, a laminate of the fuel electrode 20, the solid electrolyte film 40, the reaction prevention film 50, and the air electrode 60 corresponds to a "power-generating element A" (see FIG. 2). That is, on the upper surface of the support substrate 10, a plurality of (in this embodiment, four) the power-generating elements A are disposed at predetermined intervals along the longitudinal direction.

In each pair of the adjacent power-generating elements A, A, an air-electrode current-collecting film 70 (corresponding to the "conductive film") is formed on the upper surfaces of the air electrode 60, the solid electrolyte film 40, and the interconnector 30 in such a manner as to bridge the air electrode 60 of one (in FIG. 2, the left) power-generating element A and the interconnector 30 of the other (in FIG. 2, the right) power-generating element A. The air-electrode current-collecting film 70 is a sintered body formed of a porous material having electron conductivity. As viewed from above, the air-electrode current-collecting film 70 has a rectangular shape. The thickness of the air-electrode current-collecting film 70 is 50 to 500 µm. As described above, the fuel electrode 20 (fuel-electrode current-collecting portion 21) is connected to one surface of the thin-plate-like interconnector 30 formed of the conductive ceramics material and the air-electrode current-collecting film 70 is connected to the other surface. In other words, a "three-layered structure of the fuel electrode 20 (fuel-electrode current-collecting portion 21), the interconnector 30, and the air-electrode current-collecting film 70" is provided around an area including the interconnector 30.

The air-electrode current-collecting film 70 is formed of a "conductive ceramics material having the property of exhibiting a smaller conductivity at higher temperature within the range of 650 to 850° C." As a typical example of such material, there is given an N-type semiconductor. Actions and effects obtained through the adoption of such material are described later.

Specifically, the air-electrode current-collecting film 70 may be formed of $LaNiO_3$-based materials. Among the materials, a material represented by a chemical formula of $LaNi_{1-x-y}Cu_xFe_yO_3$ where relationships of x>0, y>0, and x+y<1 are satisfied is suitably used. The material can have as high a conductivity as, e.g., 800 S/cm or more at 750° C. and have as low a thermal expansion coefficient as, e.g., 13.5 ppm/K or less. It can therefore be said that the material is a material suitable for the air-electrode current-collecting film 70 in terms of both of the conductivity and the thermal expansion coefficient.

As described above, through formation of the air-electrode current-collecting films 70, in each pair of the adjacent power-generating elements A, A, the air electrode 60 of one (in FIG. 2, the left) power-generating element A and the fuel electrode 20 (particularly, the fuel-electrode current-collecting portion 21) of the other (in FIG. 2, the right) power-generating element A are electrically connected to each other via "the air-electrode current-collecting film 70 and the interconnector 30" having electron conductivity. As a result, a plurality of (in this embodiment, four) power-generating elements A disposed on the upper surface of the support substrate 10 are connected electrically in series. In this case, "the air-electrode current-collecting film 70 and the interconnector 30" having electron conductivity collectively correspond to the "electrical connection."

In the "segmented-in-series type" SOFC as described above, as illustrated in FIG. 3, a fuel gas (hydrogen gas or the like) is allowed to flow through the fuel gas flow channels 11 of the support substrate 10, and the upper and lower surfaces of the support substrate 10 (particularly the air-electrode current-collecting films 70) are exposed to a "gas containing oxygen" (air or the like) (alternatively, a gas containing oxygen is allowed to flow along the upper and lower surfaces of the support substrate 10), whereby an electromotive force is generated according to a difference in partial pressure of oxygen between the opposite surfaces of the solid electrolyte film 40. Further, when this structure is connected to an external load, chemical reactions represented by the following formulae (1) and (2) occur, and a current flows (power generation condition).

$$(\tfrac{1}{2}).O_2+2e^-\to O^{2-} \text{(at the air electrode 60)} \qquad (1)$$

$$H_2+O^{2-}\to H_2O+2e^- \text{(at the fuel electrode 20)} \qquad (2)$$

Figure 3:
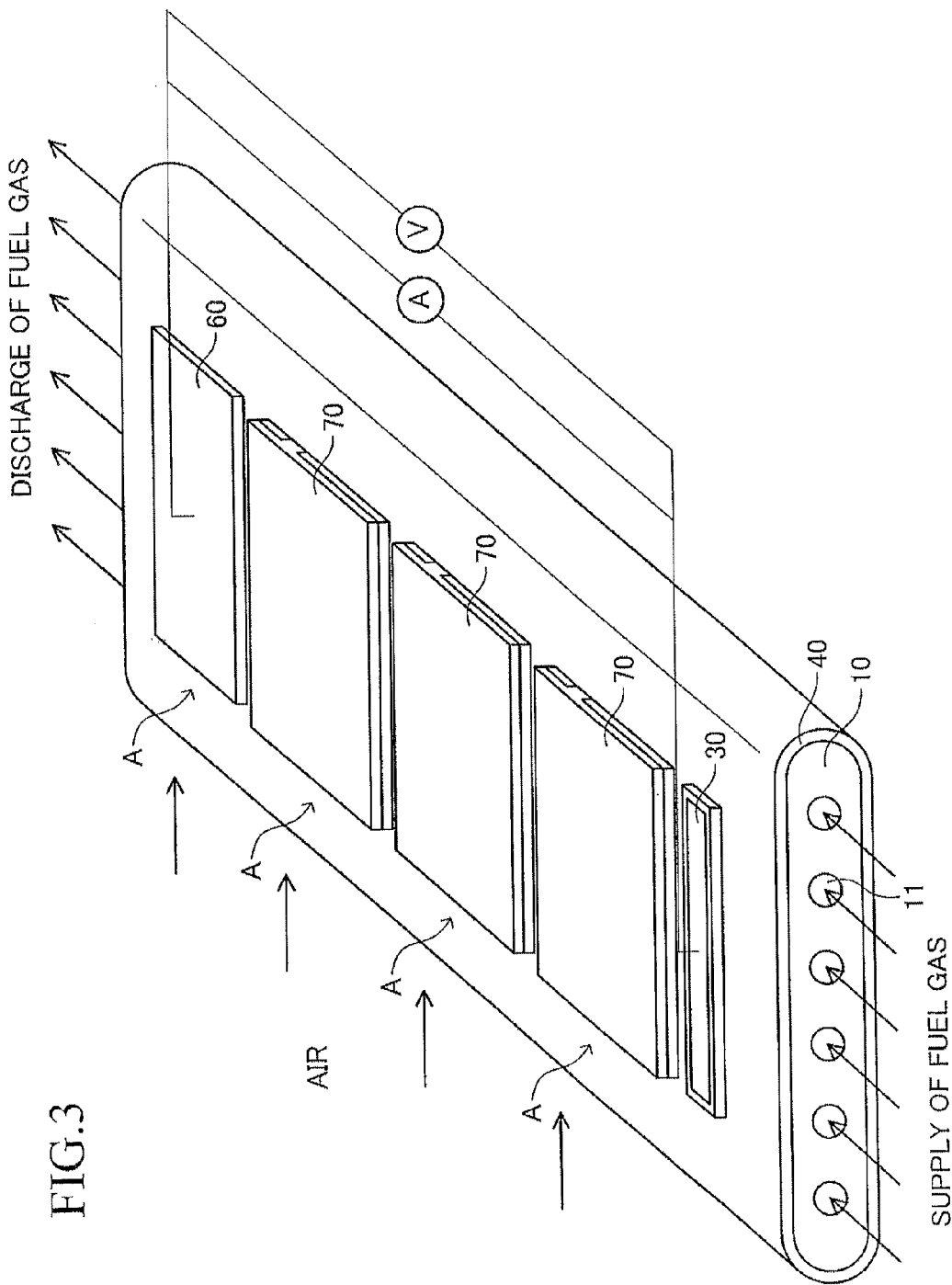
FIG. 3 is a view illustrating an operation state of the fuel cell illustrated in FIG. 1.
Figure 4:
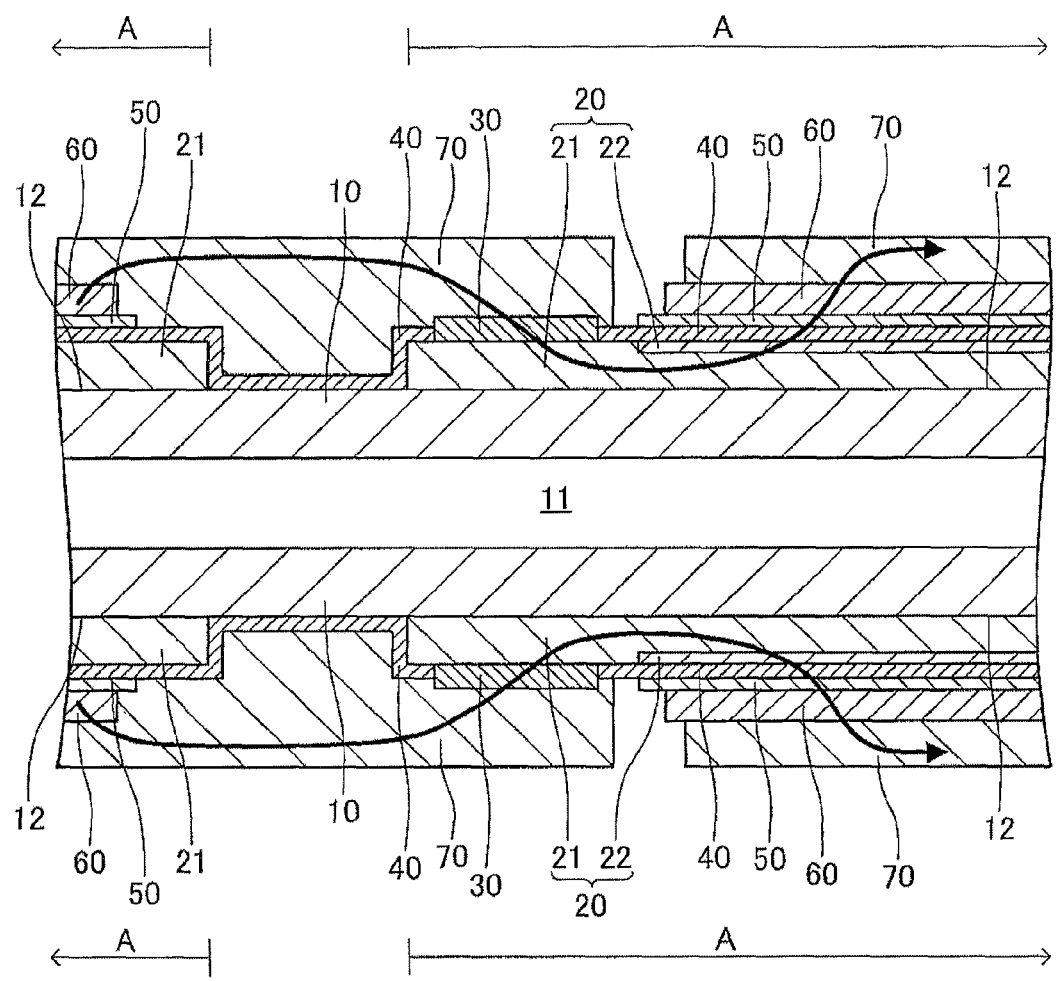
FIG. 4 is a view illustrating the flow of a current under the operation state of the fuel cell illustrated in FIG. 1.

In the power generation condition, as illustrated in FIG. 4, in each pair of the adjacent power-generating elements A, A, a current flows as indicated by the arrows. As a result, power is output from the entire SOFC as illustrated in FIG. 3 (specifically, via the interconnector 30 of the power-generating element A located on the nearest side in FIG. 3 and the air electrode 60 of the power-generating element A located on the farthest side in FIG. 3).

(Manufacturing Method)

Next, an exemplary manufacturing method for the "segmented-in-series type" SOFC illustrated in FIG. 1 is briefly described with reference to FIGS. 5 to 12. In FIGS. 5 to 12, the trailing letter "g" of reference numerals of members indicates that the members are "green."

Figure 5:
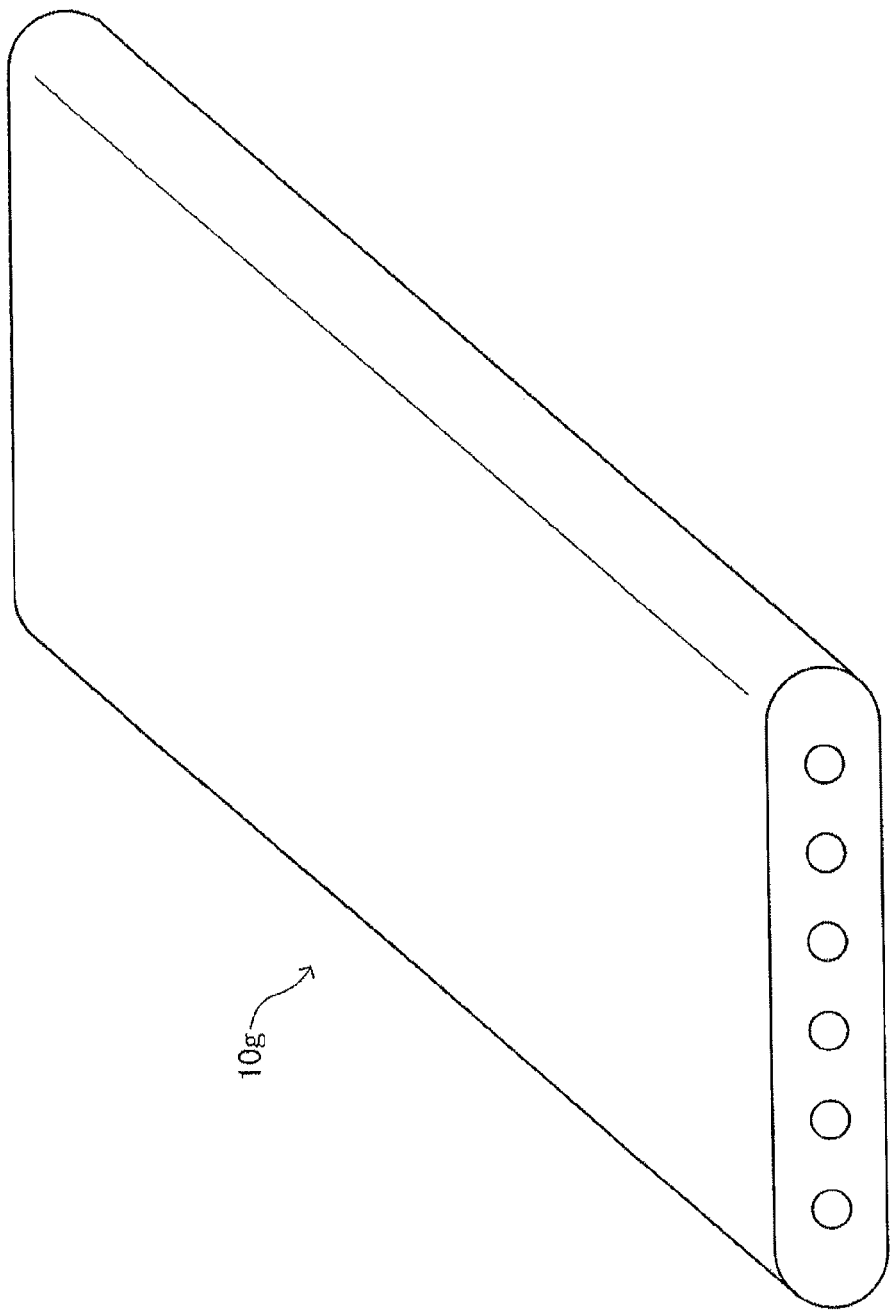
FIG. 5 is a perspective view illustrating a support substrate illustrated in FIG. 1.

First, a green body 10g of the support substrate having a shape illustrated in FIG. 5 is produced. The green body 10g of the support substrate can be produced, for example, by use of a slurry prepared by adding a binder and the like to a powder of a material (e.g., CSZ) for the support substrate 10 and through utilization of extrusion molding, machining, and other working processes. The description of the method continues below with reference to FIGS. 6 to 12, which are fragmentary sectional views of the green body 10g of the support substrate illustrated in FIG. 5.

Figure 6:
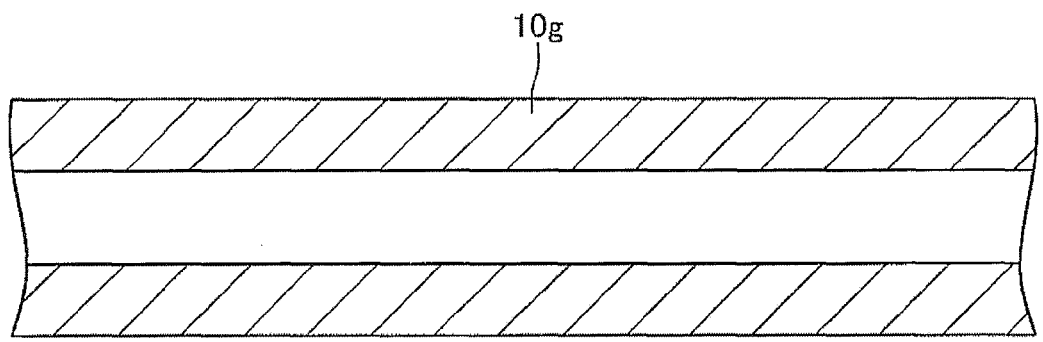
FIG. 6 is a sectional view corresponding to FIG. 2 as viewed at the first stage in a process for manufacturing the fuel cell illustrated in FIG. 1.
Figure 7:
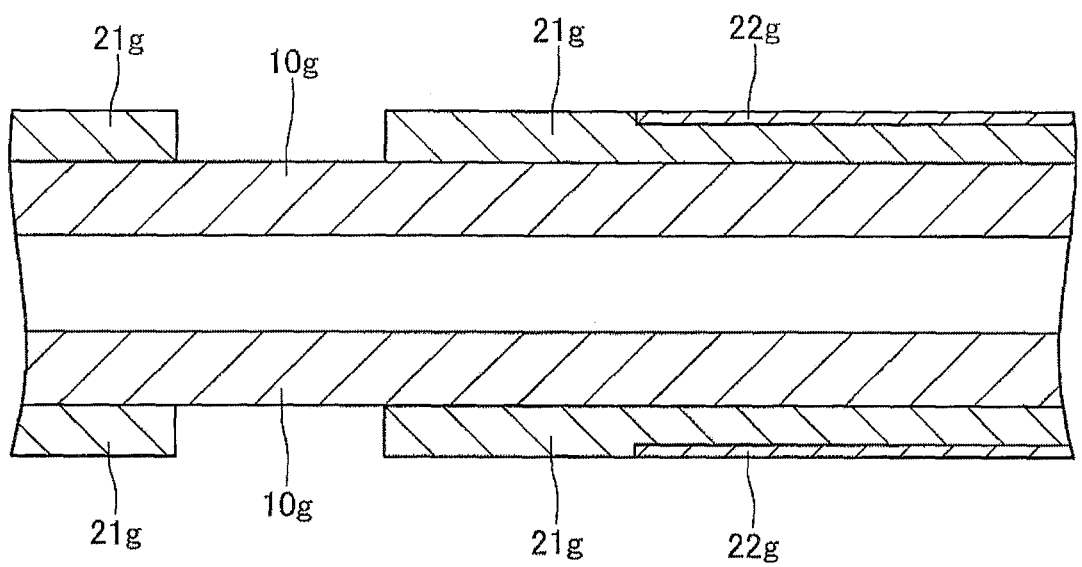
FIG. 7 is a sectional view corresponding to FIG. 2 as viewed at the second stage in the process for manufacturing of the fuel cell illustrated in FIG. 1.

After the green body 10g of the support substrate is produced as illustrated in FIG. 6, as illustrated in FIG. 7, green bodies (21g+22g) of the fuel electrodes are formed at predetermined positions on the upper and lower surfaces of the green body 10g of the support substrate. The green bodies (21g+22g) of the fuel electrodes are formed, for example, by use of a slurry prepared by adding a binder and the like to a powder of a material (e.g., Ni and YSZ) for the fuel electrode 20 and through utilization of a printing process, or the like.

Figure 8:
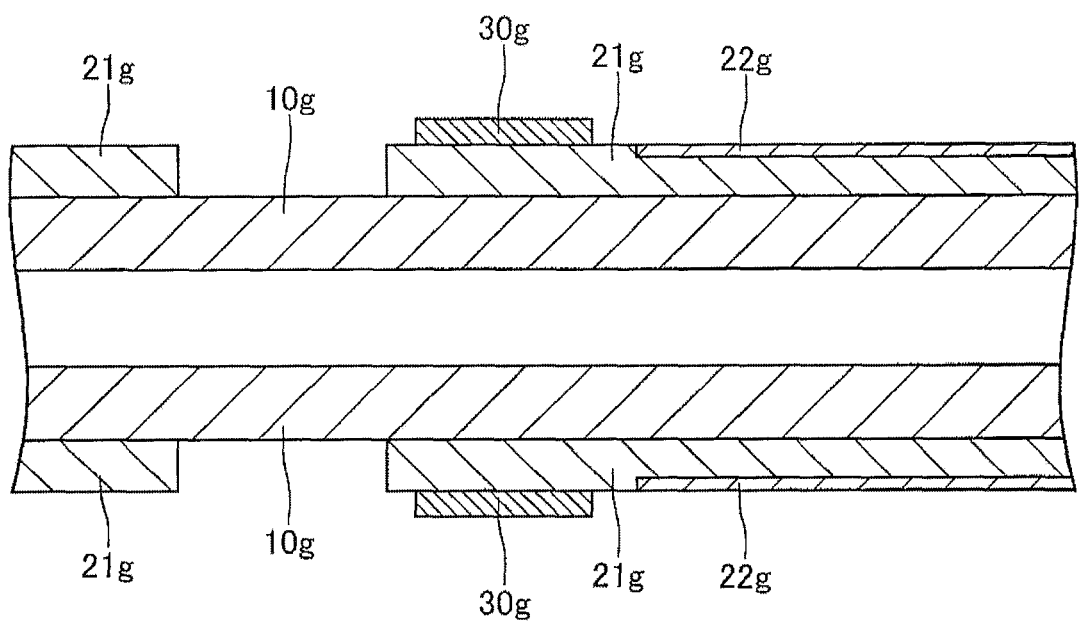
FIG. 8 is a sectional view corresponding to FIG. 2 as viewed at the third stage in the process for manufacturing the fuel cell illustrated in FIG. 1.

Next, as illustrated in FIG. 8, green films 30g of the interconnectors are formed at predetermined positions on the outer surfaces of the green bodies 21g of the fuel electrodes. The green films 30g of the interconnectors are formed, for example, by use of a slurry prepared by adding a binder and the like to a powder of a material (e.g., $LaCrO_3$) for the interconnector 30 and through utilization of a printing process or the like.

Figure 9:
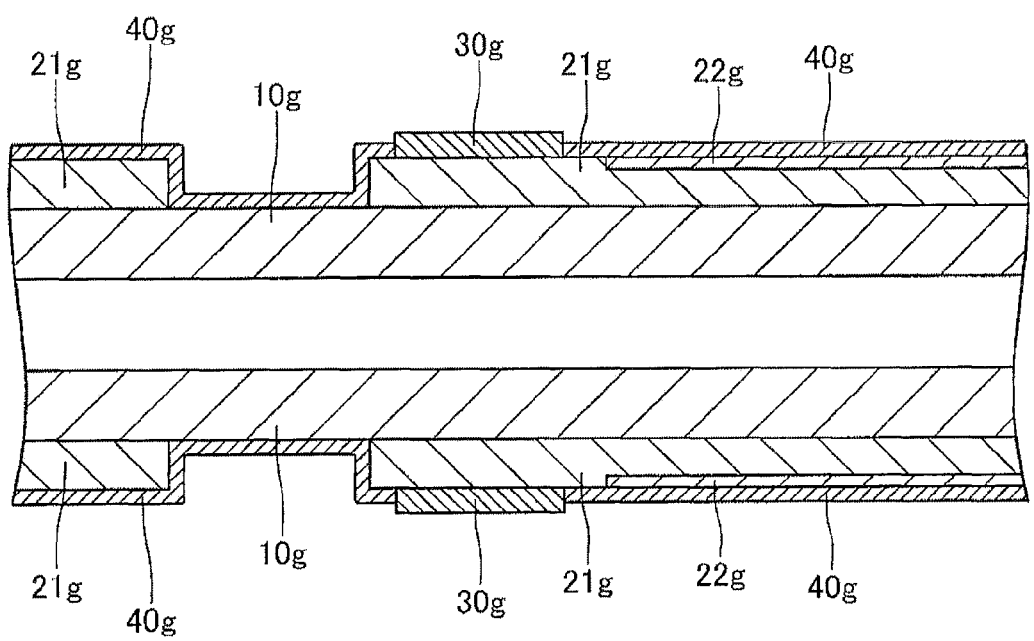
FIG. 9 is a sectional view corresponding to FIG. 2 as viewed at the fourth stage in the process for manufacturing the fuel cell illustrated in FIG. 1.

Next, as illustrated in FIG. 9, a green film 40g of the solid electrolyte film is formed on the entire longitudinally extending outer surface of the green body 10g of the support substrate in which a plurality of the green bodies (21g+22g) of the fuel electrodes and are formed in an embedded manner (including outer end surfaces of the green body 10g of the support substrate), except for portions on which a plurality of the green bodies 30g of the interconnectors are formed. The green film 40g of the solid electrolyte film is formed, for example, by use of a slurry prepared by adding a binder and the like to a powder of a material (e.g., YSZ) for the solid electrolyte film 40 and through utilization of a printing process, a dipping process, or the like.

Figure 10:
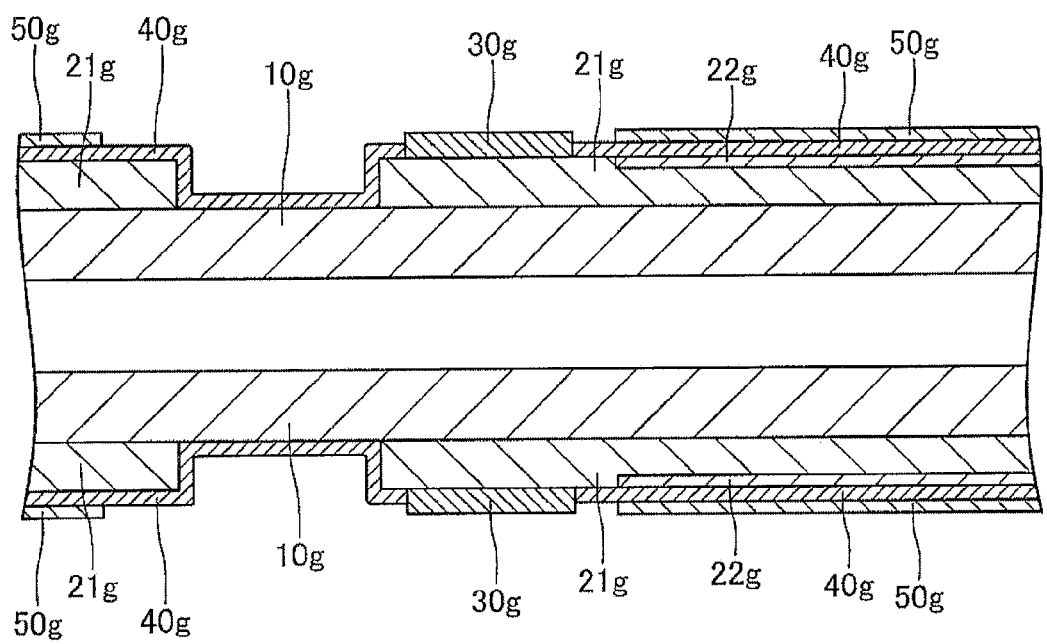
FIG. 10 is a sectional view corresponding to FIG. 2 as viewed at the fifth stage in the process for manufacturing the fuel cell illustrated in FIG. 1.

Next, as illustrated in FIG. 10, green films 50g of the reaction prevention films are formed on the respective outer surfaces of those portions of the green body 40g of the solid electrolyte film which are in contact with the green bodies 22g of the fuel electrodes. The green films 50g of the reaction prevention films are formed, for example, by use of a slurry prepared by adding a binder and the like to a powder of a material (e.g., GDC) for the reaction prevention film 50 and through utilization of a printing process or the like.

Then, the green body 10g of the support substrate on which such various green films are formed is sintered at 1,400 to 1,500° C. for 1 to 20 hours in air. By this procedure, there is yielded a structure in a state in which the air electrodes 60 and the air-electrode current-collecting films 70 are removed from the SOFC illustrated in FIG. 1.

Figure 11:
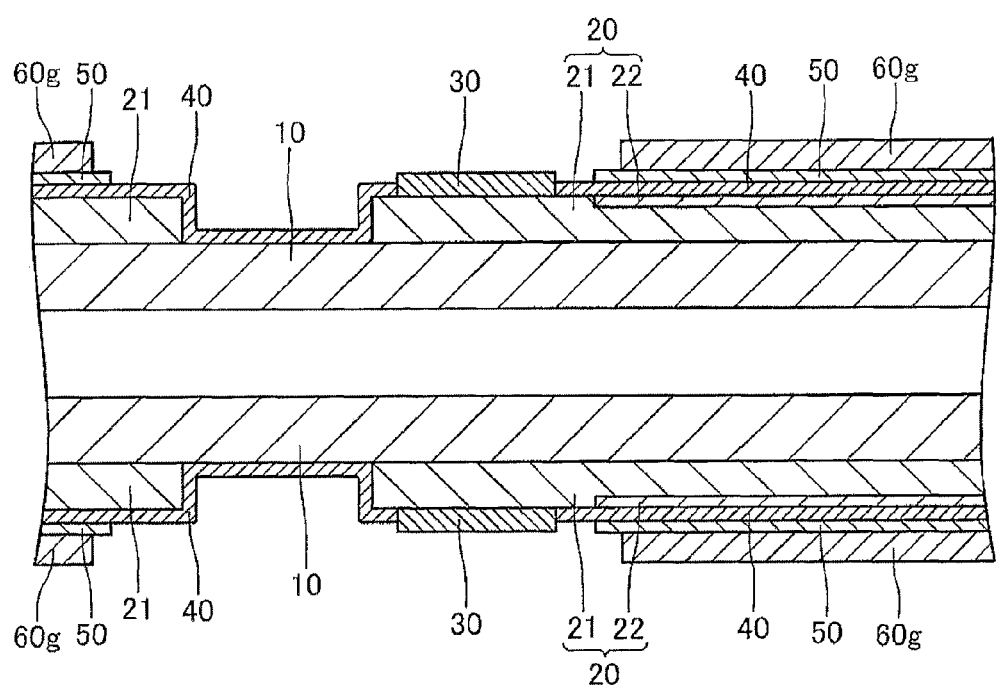
FIG. 11 is a sectional view corresponding to FIG. 2 as viewed at the sixth stage in the process for manufacturing structure of the fuel cell illustrated in FIG. 1.

Next, as illustrated in FIG. 11, green films 60g of the air electrodes are formed on the outer surfaces of the reaction prevention films 50, respectively. The green films 60g of the air electrodes are formed, for example, by use of a slurry prepared by adding a binder and the like to a powder of a material (e.g., LSCF) for the air electrode 60 and through utilization of a printing process or the like.

Figure 12:
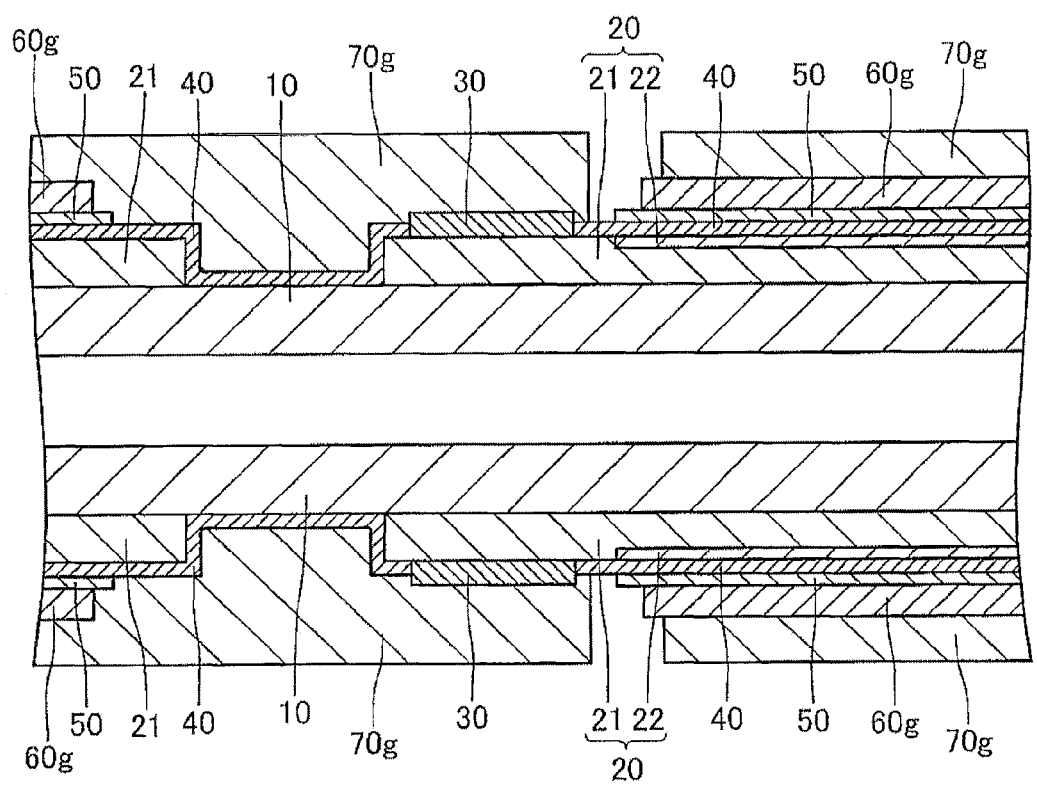
FIG. 12 is a sectional view corresponding to FIG. 2 as viewed at the seventh stage in the process for manufacturing the fuel cell illustrated in FIG. 1.

Next, as illustrated in FIG. 12, in each pair of the adjacent power-generating elements, a green film 70g of the air-electrode current-collecting film is formed on the outer surfaces of the green film 60g of the air electrode, the solid electrolyte film 40, and the interconnector 30 in such a manner as to bridge the green film 60g of the air electrode of one power-generating element and the interconnector 30 of the other power-generating element. The green films 70g of the air-electrode current-collecting films are formed, for example, by use of a slurry prepared by adding a binder and the like to a powder of a material (e.g., $LaNiO_3$) for the air-electrode current-collecting film 70 and through utilization of a printing process or the like.

Then, the support substrate 10 in a state in which the green films 60g and 70g are thus formed is sintered at 900 to 1,100° C. for 1 to 20 hours in air. By this procedure, the SOFC illustrated in FIG. 1 is yielded. So far, the example exemplary manufacturing method for the SOFC illustrated in FIG. 1 has been described.

(Suppression of Fluctuation in Current Density of a Current Flowing Through Interconnector 30 and Area in Vicinity Thereof)

Next, actions and effects of the material for the air-electrode current-collecting film 70 formed on the surface of the interconnector 30 in the SOFC according to this embodiment described above are described.

In the SOFC according to this embodiment, as illustrated in FIG. 4 above, when a current flows through the air-electrode current-collecting film 70, the interconnector 30, and the fuel electrode 20 in the stated order during SOFC operation, the current first flows in the right direction in the air electrode-collecting film 70 and then turns downward so that the current flows downward through the air-electrode current-collecting film 70, the interconnector 30, and the fuel electrode 20 in the stated order in FIG. 4 in broad outline.

Figure 13:
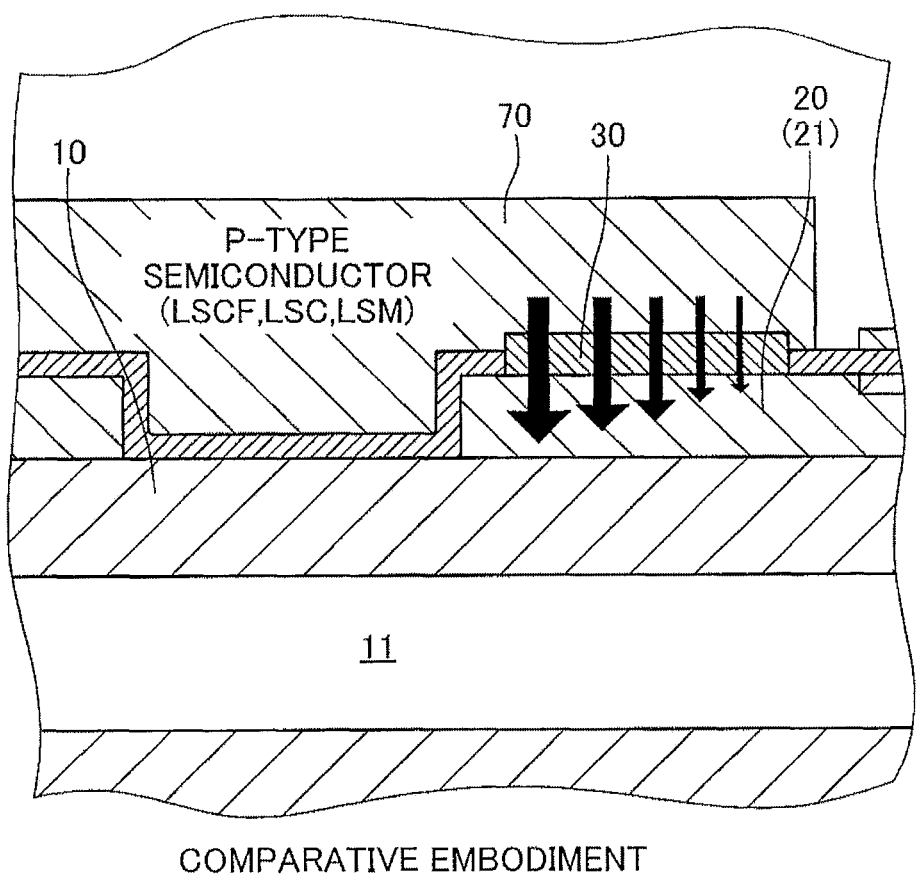
FIG. 13 is a view corresponding to FIG. 2 for illustrating a fluctuation in current density of a current flowing through the an interconnector and an area in the vicinity thereof in a comparative embodiment relative to the embodiment of the present invention illustrated in FIG. 1.

On the other hand, in general, a current is likely to flow through a path with lower electric resistance. In the SOFC according to this embodiment, therefore, as illustrated in FIG. 13, it is considered that, with regard to a current flowing through the interconnector 30 and the area in the vicinity thereof, the amplitude of the current (amplitude of current per unit area, current density) becomes larger as the current flows through a position on the more left side in the horizontal direction of the interconnector 30 in FIG. 13. This is based on, for example, the fact that the current path becomes shorter (i.e., the electric resistance becomes smaller) as the current flows through a position on the more left side in the horizontal direction of the interconnector 30 in FIG. 13. It should be noted that, in FIG. 13, the bolder and longer black arrow means a higher current density (the same holds true for FIGS. 14, 17 and 18 to be described later).

Thus, in this embodiment, a fluctuation in current density of the current flowing through the interconnector 30 and the area in the vicinity thereof may inevitably occur largely depending on the flow direction of the current flowing through the air-electrode current-collecting film 70 toward the interconnector 30. In addition, in general, the degree of heat generation due to Joule heat or the like becomes larger at a portion with a higher current density. In this embodiment, therefore, a higher current density in the interconnector 30 and the area in the vicinity thereof have a higher temperature.

Hereinafter, in order to describe actions and effects of the material for the air-electrode current-collecting film 70 according to this embodiment, first, a case where the material for the air-electrode current-collecting film 70 is a P-type semiconductor as illustrated in FIG. 13 is considered as a comparative embodiment. Examples of the P-type semiconductor include lanthanum strontium cobalt ferrite (LSCF= $(La, Sr)(Co, Fe)O_3$), lanthanum strontium cobaltite (LSC= $(La, Sr)CoO_3$), and lanthanum strontium manganite (LSM= $(La, Sr)MnO_3$).

In general, the P-type semiconductor has the property of exhibiting a larger conductivity at higher temperature. Therefore, a portion with a higher current density (portion with a higher temperature) in the air-electrode current-collecting film 70 in the vicinity of the interconnector 30 has a larger conductivity (current easily flows). This means that the "fluctuation in current density of the current flowing through the interconnector 30 and the area in the vicinity thereof" described above is enhanced.

As described above, in the case where the material for the air-electrode current-collecting film 70 is the P-type semiconductor, once a fluctuation in current density of the current flowing through the interconnector 30 and the area in the vicinity thereof occurs, the fluctuation is enhanced. As a result, a fluctuation in temperature in the interconnector 30 and the area in the vicinity thereof increases, which may cause the problem of the occurrence of a locally large thermal stress.

Figure 14:
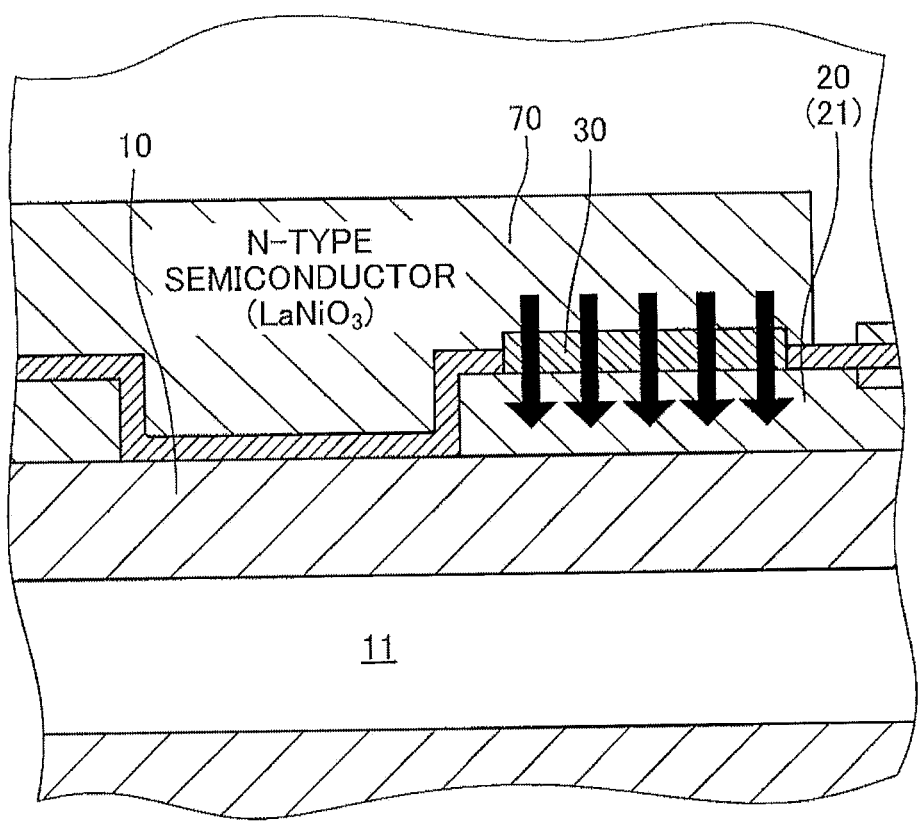
FIG. 14 is a view corresponding to FIG. 2 for illustrating a fluctuation in current density of a current flowing through an interconnector and an area in the vicinity thereof in the embodiment of the present invention illustrated in FIG. 1.

In this embodiment, in contrast, as illustrated in FIG. 14, the "conductive ceramics material having the property of exhibiting a smaller conductivity at higher temperature within the range of SOFC operation temperatures of 650 to 850° C." is used as the material for the air-electrode current-collecting film 70 as described above. Typical examples of the material include an N-type semiconductor (e.g., $LaNiO_3$).

In this embodiment, a portion with a higher current density (portion with a higher temperature) in the air-electrode current-collecting film 70 in the vicinity of the interconnector 30 has a smaller conductivity (current hardly flows through the portion) during SOFC operation, in contrast to the comparative embodiment described above. This means that "the fluctuation in current density of the current flowing through the interconnector 30 and the area in the vicinity thereof" described above is suppressed. Therefore, actions and effects of reducing a fluctuation in temperature in the interconnector 30 and the area in the vicinity thereof are exhibited. As a result, a locally large thermal stress becomes unlikely to occur in the interconnector 30 and the area in the vicinity thereof.

It should be noted that, as described above, the air-electrode current-collecting film 70 has a conductivity of, e.g., 800 S/cm or more at 750° C. On the other hand, the interconnector 30 has a conductivity of, e.g., 0.1 to 5 S/cm at 750° C. and the fuel electrode 20 (fuel-electrode current-collecting portion 21) has a conductivity of, e.g., 300 to 2,000 S/cm at 750° C. The conductivities of the fuel electrode 20 (fuel-electrode current-collecting portion 21) and the air-electrode current-collecting film 70 are extremely larger than the conductivity of the interconnector 30.

Figure 15:
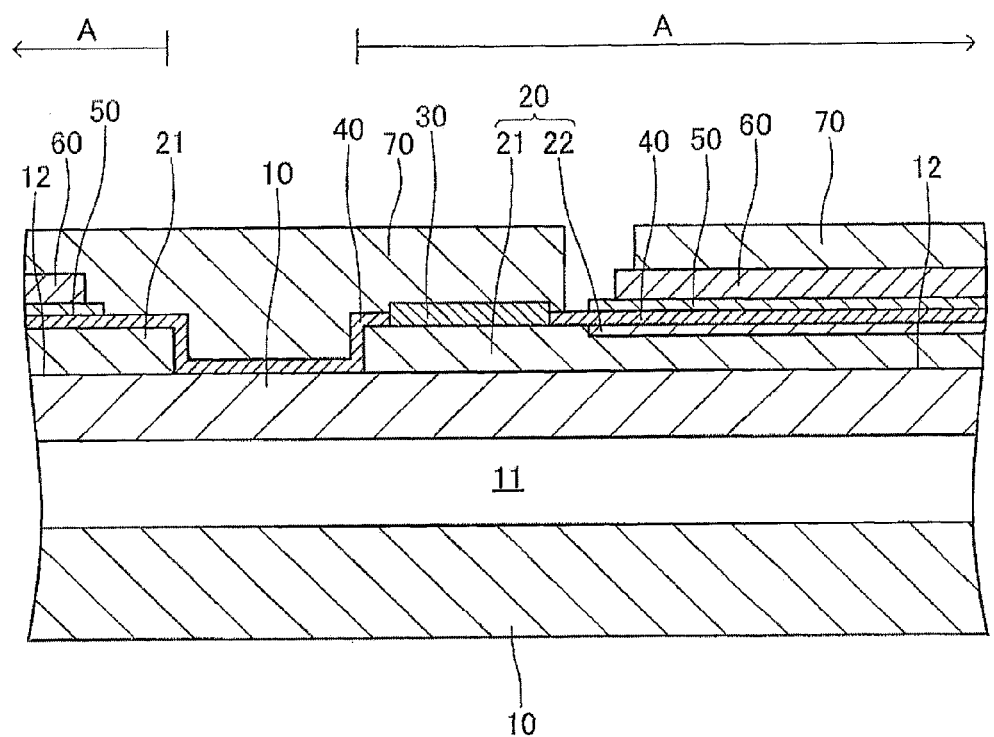
FIG. 15 is a sectional view corresponding to FIG. 2 of a fuel cell according to another modified embodiment of the embodiment of the present invention.

It should be noted that the present invention is not limited to the embodiment described above, and various modified embodiments may be adopted without departing from the scope of the present invention. For example, in the embodiment, the plurality of power-generating elements A are provided on both of the upper and lower surfaces of the flat-plate-like support substrate 10, but the plurality of power-generating elements A may be provided on only one side of the support substrate 10, as illustrated in FIG. 15. In the embodiment, moreover, the fuel electrode 20 includes two layers including the fuel-electrode current-collecting portion 21 and the fuel-electrode active portion 22, but the fuel electrode 20 may include a single layer corresponding to the fuel-electrode active portion 22.

Figure 16:
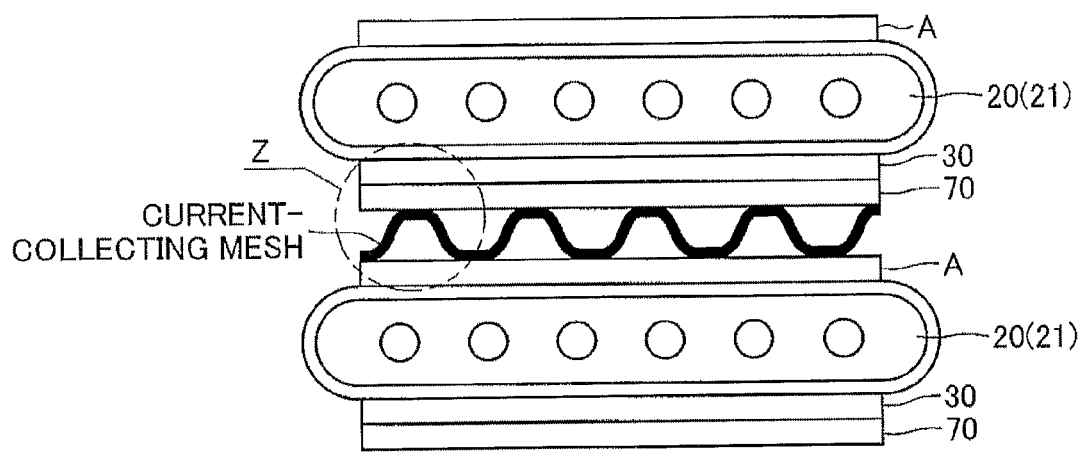
FIG. 16 is a front view of a fuel cell according to another modified embodiment of the embodiment of the present invention.

In the embodiment, further, the "segmented-in-series type" SOFC is adopted, but the so-called "vertical stripe type" SOFC may be adopted as illustrated in FIG. 16. The configurations corresponding to those illustrated in FIG. 2 and the like in FIG. 16 are represented by the same reference symbols as those shown in FIG. 2 and the like.

In the "vertical stripe type" SOFC illustrated in FIG. 16, two SOFCs are laminated in the thickness direction of the cells. The flat-plate-like support substrate of each of the SOFCs also serves as the fuel electrode 20 having provided therein fuel gas flow channels. The power-generating element A is provided on the upper surface of each of the support substrates (fuel electrodes) and the interconnector 30 is provided on the lower surface of each of the support substrates (fuel electrodes). Conductive films 70 are formed below the lower surfaces of the interconnectors 30. The conductive film 70 of one of the adjacent two SOFCs is electrically connected with a metallic current-collecting member to the air electrode 60 of the power-generating element A of the other of the cells. As a result, the adjacent SOFCs are electrically connected in series via the metallic current-collecting member, the conductive film 70, and the interconnector 30.

In the embodiment illustrated in FIG. 16, during SOFC operation, the current flows upward through a current-collecting mesh, the conductive film 70, the interconnector 30, and the fuel electrode 20 in the stated order in FIG. 16 in broad outline.

Figure 17:
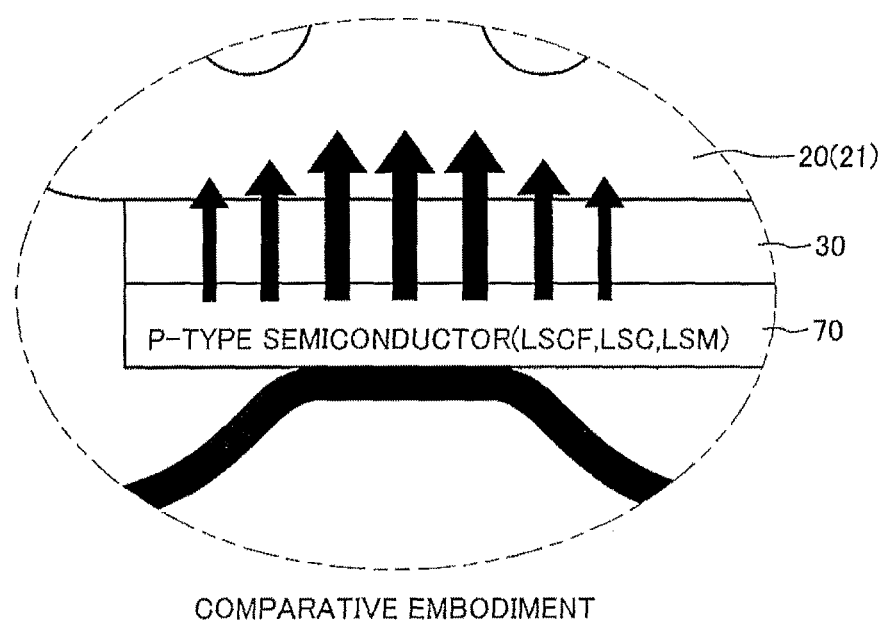
FIG. 17 is an enlarged view of a "Z" portion of FIG. 16 for illustrating a fluctuation in current density of a current flowing through an interconnector and an area in the vicinity thereof in a comparative embodiment of a modified embodiment of another embodiment of the present invention illustrated in FIG. 16.

On the other hand, as described above, the current is likely to flow through a path with lower electric resistance. In the embodiment illustrated in FIG. 16, therefore, as illustrated in FIG. 17, with regard to the current flowing through the interconnector 30 and the area in the vicinity thereof, when the current flows through an area where the metallic current-collecting member is brought into contact with the conductive film 70 in the horizontal direction of the interconnector 30, the current density of the current increases. In contrast, the current flows over an additionally long distance through the conductive film 70 in an area where the metallic current-collecting member is not brought into contact with the conductive film 70, and thus the current path is elongated, thereby causing an increase in electric resistance. Namely, the current density of the current becomes smaller as a distance from the end of the area where the metallic current-collecting member is brought into contact with the conductive film 70 becomes larger.

Thus, in the embodiment illustrated in FIG. 16, a fluctuation in current density of the current flowing through the interconnector 30 and the area in the vicinity thereof may inevitably occur largely depending on the flow range of the current flowing through the conductive film 70 toward the interconnector 30. In the embodiment illustrated in FIG. 16, therefore, a portion with a higher current density in the interconnector 30 and the area in the vicinity thereof has a higher temperature in the same manner as in the embodiments illustrated in FIG. 2 and the like.

Also in the embodiment illustrated in FIG. 16, in the case where the material for the conductive film 70 is the P-type semiconductor as illustrated in FIG. 17, once a fluctuation in current density of the current flowing through the interconnector 30 and the area in the vicinity thereof occurs, the fluctuation is enhanced for the same reason as in the case of the embodiment illustrated in FIG. 13. As a result, a fluctuation in temperature in the interconnector 30 and the area in the vicinity thereof increases, which may cause the problem of the occurrence of a locally large thermal stress.

Figure 18:
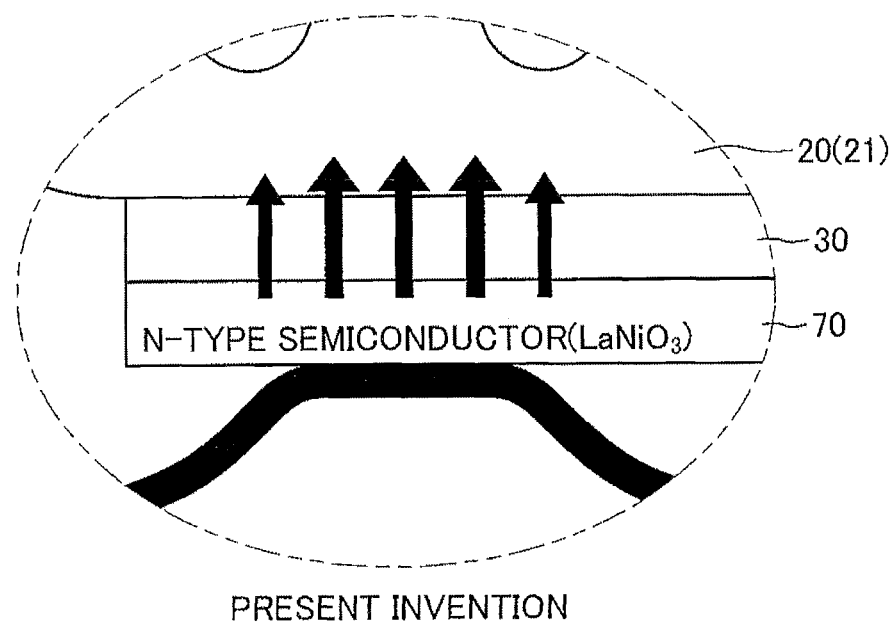
FIG. 18 is an enlarged view of the "Z" portion of FIG. 16 for illustrating a fluctuation in current density of a current flowing through an interconnector and an area in the vicinity thereof in the modified embodiment of another embodiment of the present invention illustrated in FIG. 16.

As illustrated in FIG. 18, in contrast, in the case where the material for the conductive film 70 is the N-type semiconductor (e.g., $LaNiO_3$), the "fluctuation in current density of the current flowing through the interconnector 30 and the area in the vicinity thereof" described above can be suppressed during SOFC operation for the same reason as in the case of the embodiment illustrated in FIG. 14. Therefore, actions and effects of reducing a fluctuation in temperature in the interconnector 30 and the area in the vicinity thereof can be exhibited. As a result, a locally large thermal stress becomes unlikely to occur in the interconnector 30 and the area in the vicinity thereof.

In addition, in the embodiment, the interconnector having formed thereon the conductive film of the N-type semiconductor is provided on the fuel electrode, but the interconnector (dense conductive ceramics) having formed thereon the conductive film formed of the N-type semiconductor may be provided on the air electrode. Also in this case, the "fluctuation in current density of the current flowing through the interconnector and the area in the vicinity thereof" can be suppressed in the same manner as described above.

Figure 19:
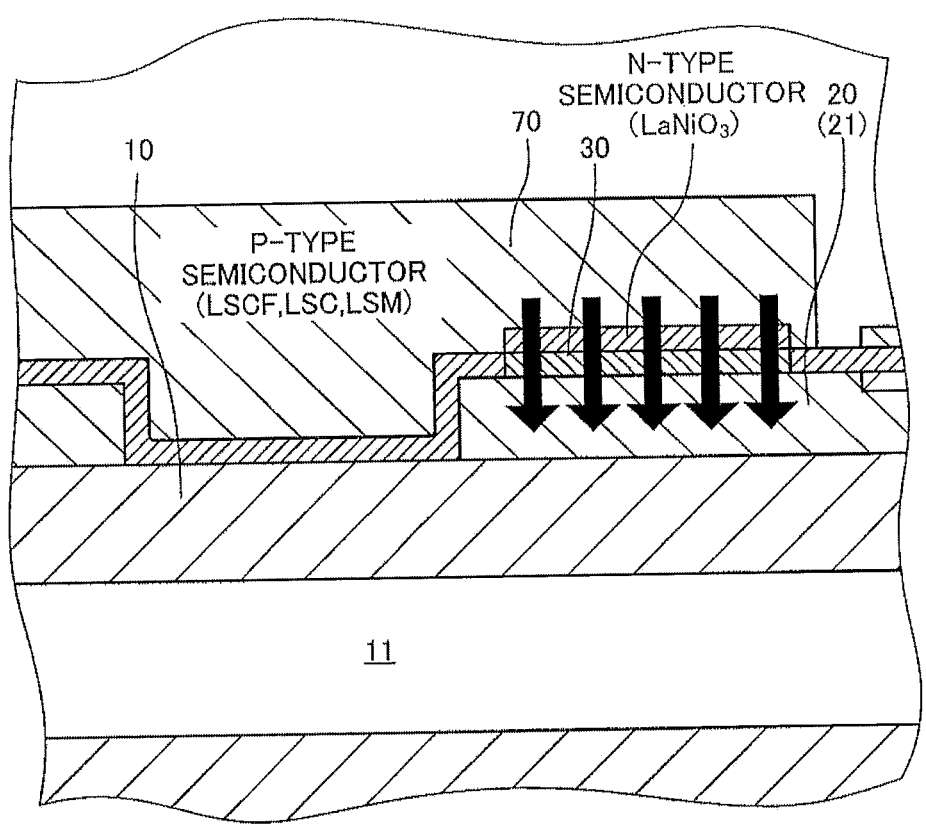
FIG. 19 is a view corresponding to FIG. 14 of a fuel cell according to another modified embodiment of the embodiment of the present invention.

In the embodiment, further, as illustrated in FIG. 14, the air-electrode current-collecting film 70 formed of the N-type semiconductor (e.g., $LaNiO_3$) is directly formed (laminated) on the outer surface of the interconnector 30. As illustrated in FIG. 19, however, a film formed of the N-type semiconductor (e.g., $LaNiO_3$) may be directly formed (laminated) on the outer surface of the interconnector 30 and then the air-electrode current-collecting film 70 formed of the P-type semiconductor such as LSCF may be directly formed (laminated) on the outer surface of the film formed of the N-type semiconductor. Also in this case, the "fluctuation in current density of the current flowing through the interconnector and the area in the vicinity thereof" can be suppressed in the same manner as described above.

Figure 20:
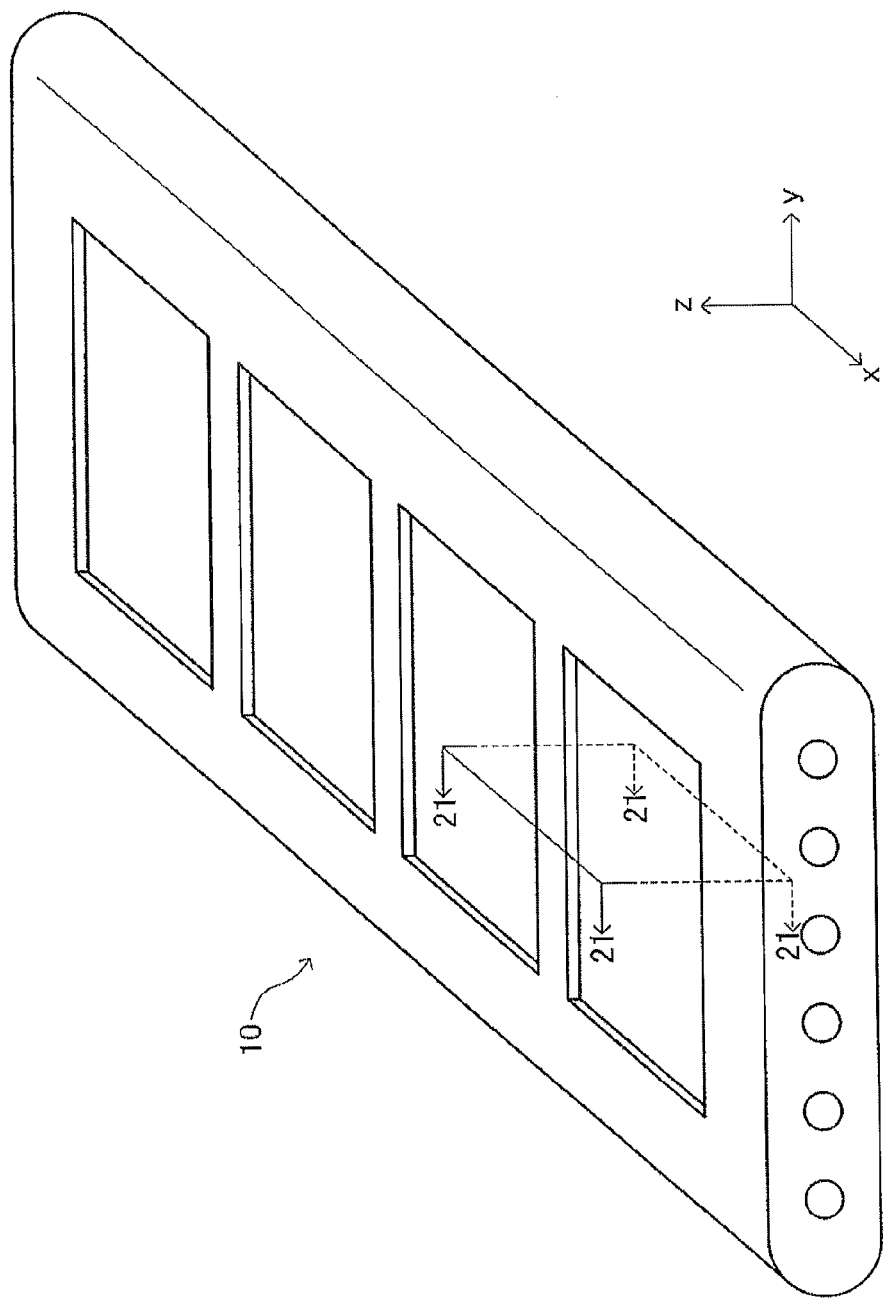
FIG. 20 is a perspective view corresponding to FIG. 5 of the fuel cell according to another modified embodiment of the embodiment of the present invention.
Figure 21:
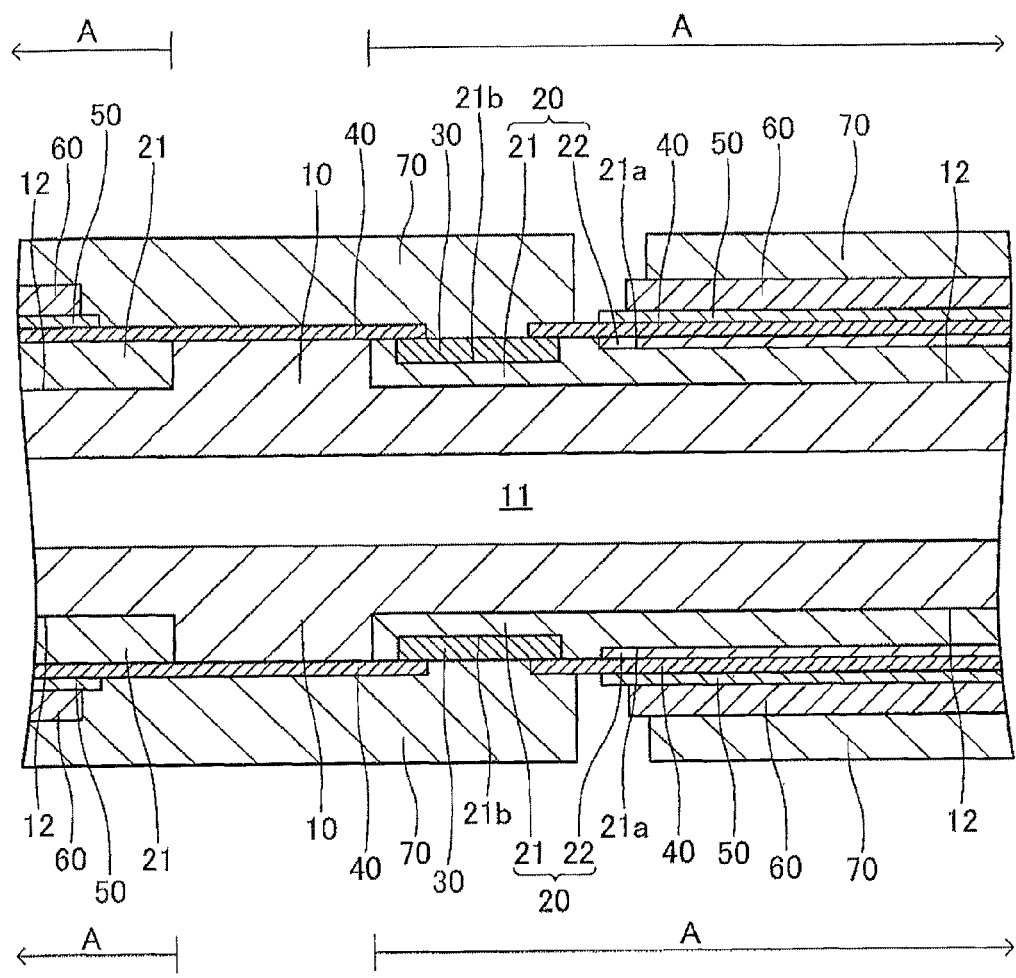
FIG. 21 is a sectional view corresponding to FIG. 2 of a fuel cell that adopts a support substrate illustrated in FIG. 20.

In the embodiment, moreover, the fuel electrode 20 is formed (laminated) on the outer surface (on the flat surface) of the flat-plate-like support substrate 10 and the interconnector 30 is formed (laminated) on the outer surface (on the flat surface) of the fuel electrode 20. As illustrated in FIGS. 20 to 22, however, the fuel electrode 20 may be embedded in a recess (see FIG. 20) formed in the outer surface of the support substrate 10 and the interconnector 30 may be embedded in a recess formed in the outer surface of the fuel electrode 20. Hereinafter, major differences of the embodiments illustrated in FIGS. 20 to 22 from the embodiment described above are described.

In the embodiments illustrated in FIGS. 20 to 22, a plurality of recesses 12 are formed on the main surfaces (upper and lower surfaces) of the support substrate 10 at predetermined intervals along the longitudinal direction. Each of the recesses 12 is a rectangular-parallelepiped-like depression defined by a bottom wall formed of the material for the support substrate 10 and side walls (two side walls along the longitudinal direction and two side walls along the width direction) entirely formed of the material for the support substrate 10 arranged in a circumferentially closed manner. The fuel-electrode current-collecting portions 21 are embedded entirely in (filled into) the recesses 12. Thus, each of the fuel-electrode current-collecting portions 21 has a rectangular parallelepiped shape.

Each of the fuel-electrode current-collecting portions 21 has a recess 21a formed on its upper surface (outer surface). Each of the recesses 21a is a rectangular-parallelepiped-like depression defined by a bottom wall formed of the material for the fuel-electrode current-collecting portion 21 and side walls (two side walls along the longitudinal direction and two side walls along the width direction) arranged in a circumferentially closed manner. Among the side walls arranged in a circumferentially closed manner, the two side walls along the longitudinal direction are formed of the material for the support substrate 10, and the two side walls along the width direction are formed of the material for the fuel-electrode current-collecting portion 21.

The fuel-electrode active portions 22 are embedded entirely in (filled into) the respective recesses 21a. Thus, each of the fuel-electrode active portions 22 has a rectangular parallelepiped shape. The fuel electrode 20 includes the fuel-electrode current-collecting portion 21 and the fuel-electrode active portion 22. The fuel electrode 20 (the fuel-electrode current-collecting portion 21 and the fuel-electrode active portion 22) is a sintered body formed of a porous material having electron conductivity. Two side surfaces along the width direction and the bottom surface of each of the fuel-electrode active portions 22 are, within the recess 21a, brought into contact with the fuel-electrode current-collecting portion 21.

On the upper surface (outer surface) of each of the fuel-electrode current-collecting portions 21, a recess 21b is formed in a region other than the recess 21a. Each of the recesses 21b is a rectangular-parallelepiped-like depression defined by a bottom wall formed of the material for the fuel-electrode current-collecting portion 21 and side walls (two side walls along the longitudinal direction and two side walls along the width direction) entirely formed of the material for the fuel-electrode current-collecting portion 21 and arranged in a circumferentially closed manner.

The interconnectors 30 are embedded in (filled into) the respective recesses 21b. Thus, each of the interconnectors 30 has a rectangular parallelepiped shape. The interconnector 30 is a sintered body formed of a dense material having electron conductivity. Four side walls (two side walls along the longitudinal direction and two side walls along the width direction) and the bottom surface of each of the interconnectors 30 are, within the recess 21b, brought into contact with the fuel-electrode current-collecting portion 21.

The upper surfaces (outer surfaces) of the fuel electrodes 20 (the fuel-electrode current-collecting portions 21 and the fuel-electrode active portions 22), the upper surfaces (outer surfaces) of the interconnectors 30, and the main surface of the support substrate 10 form a single plane (the same plane as the main surface of the support substrate 10 in the case where the recesses 12 are not formed). That is, no level difference exists among the upper surfaces of the fuel electrodes 20, the upper surfaces of the interconnectors 30, and the main surface of the support substrate 10.

The fuel-electrode active portion 22 may be formed of, for example, nickel oxide (NiO) and yttria-stabilized zirconia (YSZ) (8YSZ). Alternatively, the fuel-electrode active portion 22 may be formed of nickel oxide (NiO) and gadolinium-doped ceria (GDC). The fuel-electrode current-collecting portion 21 may be formed of, for example, nickel oxide (NiO) and yttria-stabilized zirconia (YSZ) (8YSZ). Alternatively, the fuel-electrode current-collecting portion 21 may be formed of nickel oxide (NiO) and yttria ($Y_2O_3$), or may be formed of nickel oxide (NiO) and calcia-stabilized zirconia (CSZ). The thickness of the fuel-electrode active portion 22 is 5 to 30 μm, and the thickness of the fuel-electrode current-collecting portion 21 (i.e., the depth of the recess 12) is 50 to 500 μm.

As described above, the fuel-electrode current-collecting portion 21 includes a substance having electron conductivity. The fuel-electrode active portion 22 includes a substance having electron conductivity and a substance having oxygen ion conductivity. The "volume ratio of a substance having oxygen ion conductivity relative to the total volume excluding pores" in the fuel-electrode active portion 22 is higher than the "volume ratio of a substance having oxygen ion conductivity relative to the total volume excluding pores" in the fuel-electrode current-collecting portion 21.

The interconnector 30 may be formed of, for example, lanthanum chromite ($LaCrO_3$). Alternatively, the interconnector 30 may be formed of strontium titanate (($Sr, La)TiO_3$). The thickness of the interconnector 30 is 10 to 100 μm.

The solid electrolyte film 40 covers the entire longitudinally extending outer surface of the support substrate 10 in which the fuel electrodes 20 and the interconnectors 30 are embedded in the respective recesses 12, except for surface regions corresponding to longitudinally central portions of a plurality of the interconnectors 30. The solid electrolyte film 40 is a sintered body formed of a dense material having ion conductivity and not having electron conductivity. The solid electrolyte film 40 may be formed of, for example, yttria-stabilized zirconia (YSZ) (8YSZ). Alternatively, the solid electrolyte film 40 may be formed of lanthanum gallate (LSGM). The thickness of the solid electrolyte film 40 is 3 to 50 μm.

That is, a dense film formed of the interconnectors 30 and the solid electrolyte film 40 covers the entire longitudinally extending outer surface of the support substrate 10 in which the fuel electrodes 20 are embedded in the respective recesses 12. The dense film exhibits a gas seal function of preventing the mixing of a fuel gas flowing through a space on the inside of the dense layer and air flowing through a space on the outside of the dense layer.

As illustrated in FIG. 21, in this embodiment, the solid electrolyte film 40 covers the upper surfaces of the fuel electrodes 20, longitudinally opposite end portions of the upper surfaces of the interconnectors 30, and the main surface of the support substrate 10. Meanwhile, as described above, no level difference exists among the upper surfaces of the fuel electrodes 20, the upper surfaces of the interconnectors 30, and the main surface of the support substrate 10. Thus, the solid electrolyte film 40 is flattened. As a result, as compared with the case where the solid electrolyte film 40 involves a level difference, the generation of a crack in the solid electrolyte film 40 due to stress concentration can be suppressed, whereby a deterioration in gas seal function of the solid electrolyte film 40 can be suppressed.

The air electrodes 60 are formed, via the respective reaction prevention films 50, on the respective upper surfaces of those portions of the solid electrolyte film 40 which are brought into contact with the fuel-electrode active portions 22. The reaction prevention film 50 is a sintered body formed of a dense material, and the air electrode 60 is a sintered body formed of a porous material having electron conductivity. As viewed from above, the reaction prevention film 50 and the air electrode 60 each have a rectangular shape substantially similar to that of the fuel-electrode active portion 22.

The reaction prevention film 50 may be formed of, for example, gadolinium-doped ceria (GDC=(Ce, Gd)O$_2$). The thickness of the reaction prevention film 50 is 3 to 50 μm. The air electrode 60 may be formed of, for example, lanthanum strontium cobalt ferrite (LSCF=(La, Sr)(Co, Fe)O$_3$). Alternatively, the air electrode 60 may be formed of lanthanum strontium ferrite (LSF=(La, Sr)FeO$_3$), lanthanum nickel ferrite (LNF=La(Ni, Fe)O$_3$), lanthanum strontium cobaltite (LSC=(La, Sr)CoO$_3$), or the like. Further, the air electrode 60 may be formed of two layers including a first layer (inner layer) formed of LSCF and a second layer (outer layer) formed of LSC. The thickness of the air electrode 60 is 10 to 100 μm.

It should be noted that the reason for using the reaction prevention film 50 as an intervening film is to suppress the occurrence of the phenomenon that, during SOFC production or in an operating SOFC, YSZ in the solid electrolyte film 40 and Sr in the air electrode 60 react with each other to form a reaction film having high electric resistance at the interface between the solid electrolyte film 40 and the air electrode 60.

In this case, a laminate of the fuel electrode 20, the solid electrolyte film 40, the reaction prevention film 50, and the air electrode 60 corresponds to the "power-generating element A" (see FIG. 21). That is, on the upper surface of the support substrate 10, a plurality of (in this embodiment, four) the power-generating elements A are disposed at predetermined intervals along the longitudinal direction.

In each pair of the adjacent power-generating elements A, A, the air-electrode current-collecting film 70 is formed on the upper surfaces of the air electrode 60, the solid electrolyte film 40, and the interconnector 30 in such a manner as to bridge the air electrode 60 of one (in FIG. 21, the left) power-generating element A and the interconnector 30 of the other (in FIG. 21, the right) power-generating element A. The air-electrode current-collecting film 70 is a sintered body formed of a porous material having electron conductivity. As viewed from above, the air-electrode current-collecting film 70 has a rectangular shape.

The air-electrode current-collecting film 70 may be formed of, for example, lanthanum strontium cobalt ferrite (LSCF= (La, Sr)(Co, Fe)O$_3$). Alternatively, the air-electrode current-collecting film 70 may be formed of lanthanum strontium cobaltite (LSC=(La, Sr)CoO$_3$). Alternatively, the air-electrode current-collecting film 70 may be formed of silver (Ag) or a silver-palladium alloy (Ag—Pd). The thickness of the air-electrode current-collecting film 70 is 50 to 500 μm.

As described above, through formation of the air-electrode current-collecting films 70, in each pair of the adjacent power-generating elements A, A, the air electrode 60 of one (in FIG. 21, the left) power-generating element A and the fuel electrode 20 (particularly, the fuel-electrode current-collecting portion 21) of the other (in FIG. 21, the right) power-generating element A are electrically connected to each other via "the air-electrode current-collecting film 70 and the interconnector 30" having electron conductivity. As a result, a plurality of (in this embodiment, four) power-generating elements A disposed on the upper surface of the support substrate 10 are connected electrically in series. In this case, "the air-electrode current-collecting film 70 and the interconnector 30" having electron conductivity collectively correspond to the "electrical connection."

It should be noted that the interconnector 30 corresponds to the "first portion formed of a dense material" of the "electrical connection" and has a porosity of 10% or less. The air-electrode current-collecting film 70 corresponds to the "second portion formed of a porous material" of the "electrical connection" and has a porosity of 20 to 60%.

In the embodiments illustrated in FIGS. 20 to 22 above, a "conductive ceramics material having the property of exhibiting a smaller conductivity at higher temperature within the range of SOFC operation temperatures of 650 to 850° C." is used as the material for the air-electrode current-collecting film 70 in the same manner as in the embodiment described above. Typical examples of the material include an N-type semiconductor (e.g., LaNiO$_3$). Therefore, the "fluctuation in current density of the current flowing through the interconnector 30 and the area in the vicinity thereof" described above is suppressed in the same manner as in the embodiment described above, and hence actions and effects of reducing a fluctuation in temperature in the interconnector 30 and the area in the vicinity thereof are exhibited. As a result, a locally large thermal stress becomes unlikely to occur in the interconnector 30 and the area in the vicinity thereof.

Further, each of a plurality of the recesses 12 adapted to allow the respective fuel electrodes 20 to be embedded therein has a side wall entirely formed of the material for the support substrate 10 arranged in a circumferentially closed manner. In other words, in the support substrate 10, frames which surround the respective recesses 12 are formed. Thus, this structure is unlikely to be deformed when the support substrate 10 is subjected to an external force.

Further, in a state in which members, such as the fuel electrodes 20 and the interconnectors 30, are tightly filled or embedded into the respective recesses 12 of the support substrate 10, the support substrate 10 and the embedded members are cosintered. Thus, there is yielded a sintered body having high connection strength between members and high reliability.

Further, each of the interconnectors 30 is embedded in the recess 21$b$ formed on the outer surface of the fuel-electrode current-collection portion 21. As a result, four side walls (two side walls along the longitudinal direction and two side walls along the width direction) and the bottom surface of the rectangular-parallelepiped-like interconnector 30 are, within the recess 21$b$, brought into contact with the fuel-electrode current-collecting portion 21. Thus, as compared with the case of adopting a configuration in which each of the rectangular-parallelepiped-like interconnectors 30 is laminated on (brought into contact with) the outer plane of the fuel-electrode current-collecting portion 21, the area of the interface between the fuel electrode 20 (the current-collecting portion 21) and the interconnector 30 can be increased. Thus, electron conductivity between the fuel electrode 20 and the interconnector 30 can be increased, whereby the power output of the fuel cell can be increased.

Further, a plurality of the power-generating elements A are provided on each of the upper and lower surfaces of the flat-plate-like support substrate 10. Thus, as compared with the case where a plurality of the power-generating elements are provided on only one side of the support substrate, the number of the power-generating elements in the structure can be increased, whereby the power output of the fuel cell can be increased.

In addition, the solid electrolyte film 40 covers the outer surfaces of the fuel electrodes 20, longitudinally opposite end portions of the outer surfaces of the interconnectors 30, and the main surface of the support substrate 10. Meanwhile, no level difference exists among the outer surfaces of the fuel electrodes 20, the outer surfaces of the interconnectors 30, and the main surface of the support substrate 10. Thus, the solid electrolyte film 40 is flattened. As a result, as compared with the case where the solid electrolyte film 40 involves a level difference, the generation of a crack in the solid electrolyte film 40 due to stress concentration can be suppressed, whereby a deterioration in gas seal function of the solid electrolyte film 40 can be suppressed.

What is claimed is:

1. A solid oxide fuel cell, comprising:
a power generation part of a solid oxide fuel cell provided on an outer surface of a flat-porous support substrate having formed therein a fuel gas flow channel for allowing a fuel gas to flow therethrough, comprising:
a fuel electrode for allowing the fuel gas to be reacted by bringing the fuel gas into contact therewith;
an electrolyte film provided on the fuel electrode and formed of a solid electrolyte; and
an air electrode for allowing a gas containing oxygen to be reacted, the air electrode being provided on the electrolyte film so that the electrolyte film is sandwiched between the fuel electrode and the air electrode;
wherein:
a first recess is formed on the outer surface of the flat-plate support substrate, the first recess having a bottom wall formed of a material of the support substrate and a circumferentially closed side wall entirely formed of the material of the support substrate;
the fuel electrode of the power-generating, element is embedded in the first recess;
a second recess is formed on an outer surface of the embedded fuel electrode, the second recess having a bottom wall formed of a material of the fuel electrode and a circumferentially closed side wall entirely formed of the material of the fuel electrode;
a thin-plate interconnector formed of a dense conductive ceramics materials is embedded in the second recess, with one surface of both surfaces of the interconnector being connected to the fuel electrode; and
a conductive film connected to and completely covering another surface of the both surfaces of the interconnector, the conductive film being formed of a porous conductive ceramics material having a conductivity that decreases as temperature increases within a range of 650 to 850° C.

2. A solid oxide fuel cell according to claim 1, wherein the conductive film comprises an N-type semiconductor.

3. A solid oxide fuel cell according to claim 2, wherein the conductive film comprises a material represented by a chemical formula of $LaNi_{1-x-y}Cu_xFe_yO_3$ where relationships of $x>0$, $y>0$, and $x+y<1$ are satisfied.

4. A solid oxide fuel cell according to claim 1, wherein:
the interconnector is provided on the fuel electrode; and
the interconnector comprises a chromite-based material represented by a chemical formula of $Ln_{1-x}A_xCr_{1-y-z}B_yO_3$ where Ln represents at least one kind of element selected from the group consisting of Y and lanthanoid elements, A represents at least one kind of element selected from the group consisting of Ca, Sr, and Ba, B represents at least one kind of element selected from the group consisting of Ti, V, Mn, Fe, Co, Cu, Ni, Zn, Mg, and Al, and relationships of $0.025 \leq x \leq 0.3$, $0 \leq y \leq 0.22$, and $0 \leq z \leq 0.15$ are satisfied.

5. A solid oxide fuel cell according to claim 1, wherein:
the interconnector is provided on the fuel electrode; and
the interconnector comprises a titanium oxide represented by a chemical formula of $(A_{1-x}, B_x)_{1-z}(Ti_{1-y}, D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships of $0 \leq x \leq 0.5$, $0 \leq y \leq 0.5$, and $-0.05 \leq z \leq 0.05$ are satisfied.

6. A solid oxide fuel cell according to claim 2, wherein:
the interconnector is provided on the fuel electrode; and
the interconnector comprises a chromite-based material represented by a chemical formula of $Ln_{1-x}A_xCr_{1-y-z}B_yO_3$ where Ln represents at least one kind of element selected from the group consisting of Y and lanthanoid elements, A represents at least one kind of element selected from the group consisting of Ca, Sr, and Ba, B represents at least one kind of element selected from the group consisting of Ti, V, Mn, Fe, Co, Cu, Ni, Zn, Mg, and Al, and relationships of $0.025 \leq x \leq 0.3$, $0 \leq y \leq 0.22$, and $0 \leq z \leq 0.15$ are satisfied.

7. A solid oxide fuel cell according to claim 3, wherein:
the interconnector is provided on the fuel electrode; and
the interconnector comprises a chromite-based material represented by a chemical formula of $Ln_{1-x}A_xCr_{1-y-z}B_yO_3$ where Ln represents at least one kind of element selected from the group consisting of Y and lanthanoid elements, A represents at least one kind of element selected from the group consisting of Ca, Sr, and Ba, B represents at least one kind of element selected from the group consisting of Ti, V, Mn, Fe, Co, Cu, Ni, Zn, Mg, and Al, and relationships of $0.025 \leq x \leq 0.3$, $0 \leq y \leq 0.22$, and $0 \leq z \leq 0.15$ are satisfied.

8. A solid oxide fuel cell according to claim 2, wherein:
the interconnector is provided on the fuel electrode; and
the interconnector comprises a titanium oxide represented by a chemical formula of $(A_{1-x}, B_x)_{1-z}(Ti_{1-y}, D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships of $0 \leq x \leq 0.5$, $0 \leq y \leq 0.5$, and $-0.05 \leq z \leq 0.05$ are satisfied.

9. A solid oxide fuel cell according to claim 3, wherein:
the interconnector is provided on the fuel electrode; and
the interconnector comprises a titanium oxide represented by a chemical formula of $(A_{1-x}, B_x)_{1-z}(Ti_{1-y}, D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships of $0 \leq x \leq 0.5$, $0 \leq y \leq 0.5$, and $-0.05 \leq z \leq 0.05$ are satisfied.

10. A solid oxide fuel cell, comprising:
a flat-plate porous support substrate having formed therein a fuel gas flow channel for allowing a fuel gas to flow therethrough;

a plurality of power-generating elements provided on an outer surface of the flat-plate support substrate at a plurality of positions, respectively, located apart from one another, each of the power-generating elements comprising at least a fuel electrode, a solid electrolyte, and an air electrode laminated in the stated order; and a single or a plurality of electrical connections provided between a pair of or a plurality of pairs of the adjacent power-generating elements and adapted to electrically connect the fuel electrode of one of the adjacent power-generating elements and the air electrode of another of the adjacent power-generating elements, wherein:

each of the electrical connections comprises an interconnector formed of a dense conductive ceramics material and a conductive film formed on a surface of the interconnector and formed of a porous conductive ceramics material;

first recesses are formed on the outer surface of the flat-plate support substrate at the plurality of positions, respectively, each of the first recesses having a bottom wall formed of a material of the support substrate and a circumferentially closed side wall entirely formed of the material of the support substrate;

the fuel electrodes of the power-generating elements are embedded in the corresponding first recesses;

second recesses are formed on outer surfaces of the embedded fuel electrodes, each of the second recesses having a bottom wall formed of a material of the fuel electrodes and a circumferentially closed side wall entirely formed of the material of the fuel electrodes;

the interconnectors of the electrical connections are embedded in the corresponding second recesses;

the interconnector has a thin plate shape and formed of a conductive ceramics material;

one surface of both surfaces of the interconnector is connected to the fuel electrode and another surface of the both surfaces of the interconnector is connected to the conductive film; and the conductive film comprising the porous conductive ceramics material having a conductivity that decreases as temperature increases within a range of 650 to 850° C.

* * * * *